US012718138B2

(12) United States Patent
Barberis et al.

(10) Patent No.: US 12,718,138 B2
(45) Date of Patent: Aug. 25, 2026

(54) QUANTUM-ENHANCED FEATURES FOR CLASSICAL MACHINE LEARNING

(71) Applicant: International Business Machines Corporation, Armonk, NY (US)

(72) Inventors: Nicole Barberis, Laramie, WY (US); Michael Haydock, Chanhassen, MN (US); Nicholas Torleiv Bronn, Long Island City, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1222 days.

(21) Appl. No.: 17/214,169

(22) Filed: Mar. 26, 2021

(65) Prior Publication Data

US 2022/0309386 A1 Sep. 29, 2022

(51) Int. Cl.
*G06N 20/00* (2019.01)
*G06F 17/14* (2006.01)
*G06N 10/00* (2022.01)

(52) U.S. Cl.
CPC ............. *G06N 20/00* (2019.01); *G06F 17/14* (2013.01); *G06N 10/00* (2019.01)

(58) Field of Classification Search
CPC .......... G06N 20/00; G06N 10/00; G06N 5/01; G06N 5/048; G06N 10/60; G06N 3/08; G06N 5/04; G06N 7/01; G06N 20/10; G06N 10/20; G06N 10/40; G06N 10/70; G06N 10/80; G06F 17/14
See application file for complete search history.

(56) References Cited

U.S. PATENT DOCUMENTS

| | | | | |
|---|---|---|---|---|
| 10,592,216 | B1 | 3/2020 | Richardson et al. | |
| 2016/0314406 | A1* | 10/2016 | Wiebe | G06N 10/00 |
| 2019/0080255 | A1* | 3/2019 | Allen | G06N 10/00 |
| 2019/0392343 | A1* | 12/2019 | Haah | G06N 10/20 |

(Continued)

FOREIGN PATENT DOCUMENTS

| | | | |
|---|---|---|---|
| CN | 105531725 | A | 4/2016 |
| CN | 112313678 | A | 2/2021 |

(Continued)

OTHER PUBLICATIONS

C. M. Wilson et al., "Quantum Kitchen Sinks: An algorithm for machine learning on near-term quantum computers," https://arxiv.org/pdf/1806.08321, (Year: 2019).*

(Continued)

*Primary Examiner* — David Yi
*Assistant Examiner* — Nicholas Shine
(74) *Attorney, Agent, or Firm* — Amin, Turocy & Watson, LLP

(57) ABSTRACT

Systems and techniques that facilitate quantum-enhanced features for classical machine learning are provided. In various embodiments, a system can comprise a receiver component that can access a classical dataset. In various aspects, the system can further comprise a feature component that can generate one or more machine learning input features based on a quantum transformation of the classical data set. In various instances, the system can further comprise an execution component that can execute a classical machine learning model on the one or more machine learning input features.

25 Claims, 17 Drawing Sheets

(56) References Cited

U.S. PATENT DOCUMENTS

| | | | | |
|---|---|---|---|---|
| 2020/0118025 | A1 | 4/2020 | Romero et al. | |
| 2020/0134503 | A1 | 4/2020 | Lupton | |
| 2020/0320422 | A1 | 10/2020 | Lubensky | |
| 2020/0320437 | A1 | 10/2020 | Gambetta et al. | |
| 2021/0089953 | A1 | 3/2021 | Bocharov et al. | |
| 2021/0398621 | A1* | 12/2021 | Stojevic | G16C 20/30 |
| 2022/0092460 | A1* | 3/2022 | Piveteau | G06N 10/70 |

FOREIGN PATENT DOCUMENTS

| | | | |
|---|---|---|---|
| CN | 117099112 | A | 11/2023 |
| EP | 4315185 | A1 | 2/2024 |
| JP | 2002-042104 | A | 2/2002 |
| JP | 2020-522805 | A | 7/2020 |
| JP | 2024-512443 | A | 3/2024 |
| WO | 2018/223037 | A1 | 12/2018 |
| WO | 2020016579 | | 1/2020 |
| WO | 2022/200475 | A1 | 9/2022 |

OTHER PUBLICATIONS

Maxwell Henderson, et al, "Quanvolutional Neural Networks: Powering Image Recognition with Quantum Circuits," https://arxiv.org/pdf/1904.04767, (Year: 2019).*

International Search Report and Written Opinion received for PCT Application Serial No. PCT/EP2022/057717 dated Jul. 19, 2022, 11 pages.

Shen et al., "QFCNN: Quantum Fourier Convolutional Neural Network", ACM Transactions on Multimedia Computing Communications and Applications, Association for Computing Machinery, XP058692008, Jan. 1, 1990, 14 pages.

Henderson et al., "Quanvolutional Neural Networks: Powering Image Recognition with Quantum Circuits", arxiv.org, Cornell University Library, 201 Olin Library Cornell University Ithaca, NY 14853, Apr. 9, 2019, 7 pages.

Mahmud et al., "Efficient Computation Techniques and Hardware Architectures for Unitary Transformations in Support of Quantum Algorithm Emulation," Journal of Signal Processing Systems, 2020, 21 pages.

Mell et al., The NIST Definition of Cloud Computing, Recommendations of the National Institute of Standards and Technology, NIST Special Publication 800-145, Sep. 2011, 7 pages.

Examination Report No. 1 received for Australian Patent Application Serial No. 2022246038 dated Nov. 14, 2023, 3 pages.

Examination Report No. 2 received for Australian Patent Application Serial No. 2022246038 dated Jul. 24, 2024, 2 pages.

Notice of Acceptance received for Australian Patent Application Serial No. 2022246038 dated Aug. 1, 2024, 3 pages.

Broughton et al., "Tensor Flow Quantum: A Software Framework for Quantum Machine Learning", Quantum Physics, Mar. 6, 2020, 39 pages.

Japan Patent Office, "Notice of Reasons for Refusal" Jun. 10, 2025, 10 p. JP Application No. 2023-556533.

European Patent Office, "EP Examination Report", Feb. 25, 2026, 09 pages, EP Application No 22717190.7.

Henderson, M. et al., "Quanvolutional Neural Networks: Powering Image Recognition with Quantum Circuits" arXiv, Apr. 9, 2019, 7 pages, doi: https://arxiv.org/abs/1904.04767v1.

The State Intellectual Property Office of People's Republic of China, "First Office Action", Dec. 26, 2025, 16 Pages, CN Application No. 202280024343.4.

Cangini, N., Quantum Supervised Learning: Algorithms and Implementation, Retrieved from: chrome-extension://efaidnbmnnnibpcajpcglclefindmkaj/https://amslaurea.unibo.it/id/eprint/17694/1/cangini_nicolo_tesi.pdf, , 2018, 360 pages.

* cited by examiner

Figure 13:
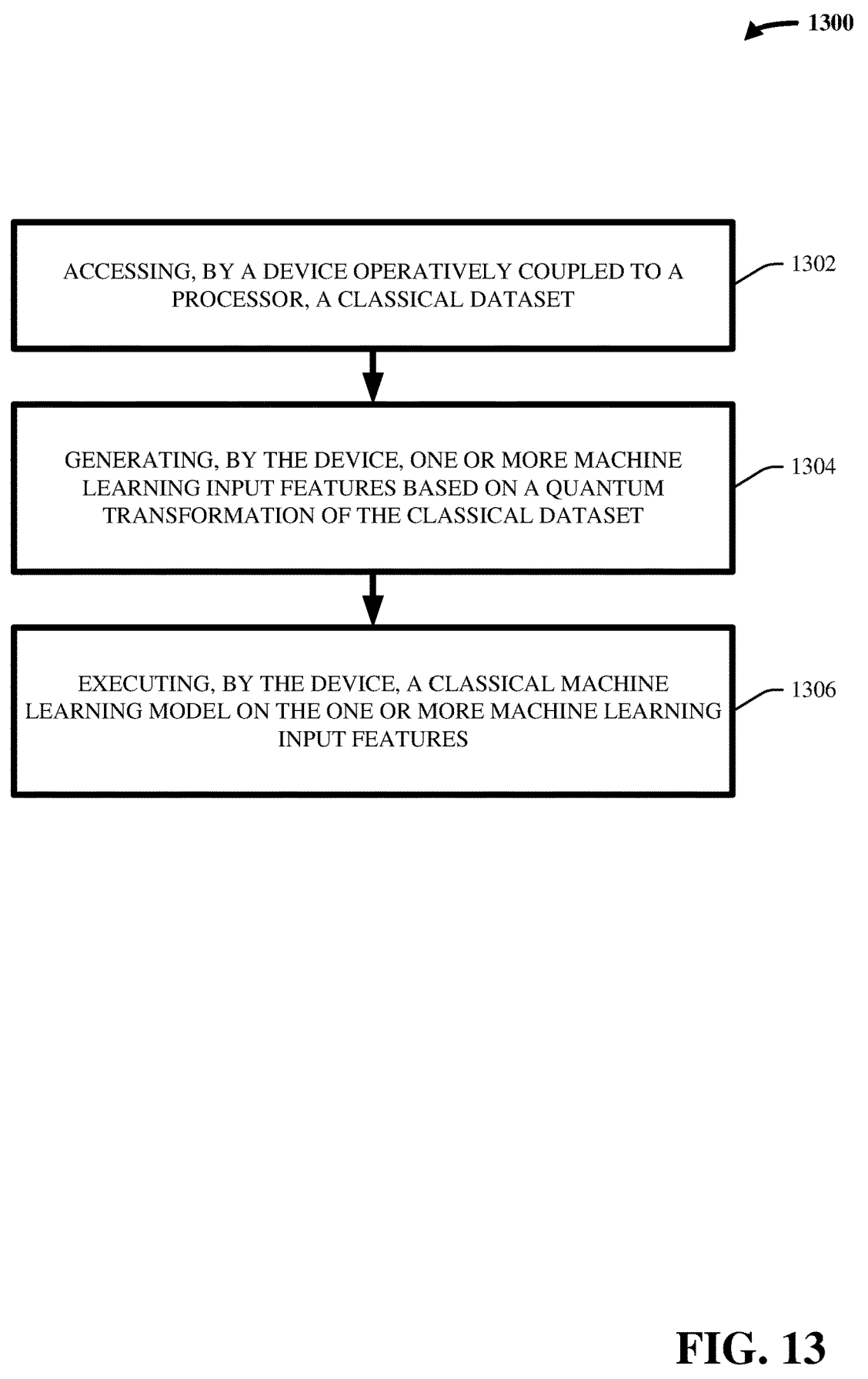

1300

ACCESSING, BY A DEVICE OPERATIVELY COUPLED TO A PROCESSOR, A CLASSICAL DATASET

1302

GENERATING, BY THE DEVICE, ONE OR MORE MACHINE LEARNING INPUT FEATURES BASED ON A QUANTUM TRANSFORMATION OF THE CLASSICAL DATASET

1304

EXECUTING, BY THE DEVICE, A CLASSICAL MACHINE LEARNING MODEL ON THE ONE OR MORE MACHINE LEARNING INPUT FEATURES

Figure 14:
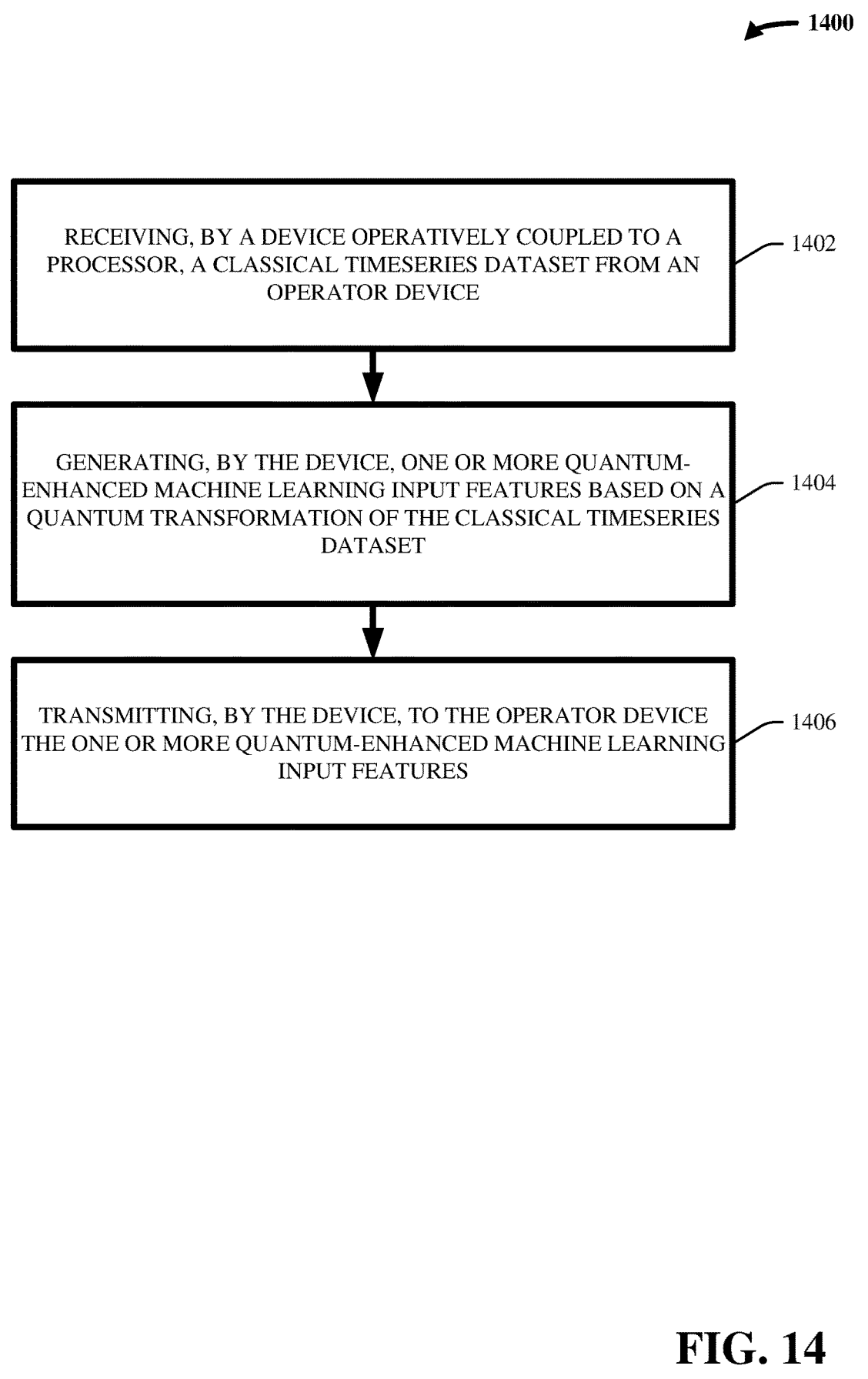

RECEIVING, BY A DEVICE OPERATIVELY COUPLED TO A PROCESSOR, A CLASSICAL TIMESERIES DATASET FROM AN OPERATOR DEVICE

1402

GENERATING, BY THE DEVICE, ONE OR MORE QUANTUM-ENHANCED MACHINE LEARNING INPUT FEATURES BASED ON A QUANTUM TRANSFORMATION OF THE CLASSICAL TIMESERIES DATASET

1404

TRANSMITTING, BY THE DEVICE, TO THE OPERATOR DEVICE THE ONE OR MORE QUANTUM-ENHANCED MACHINE LEARNING INPUT FEATURES

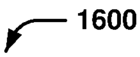
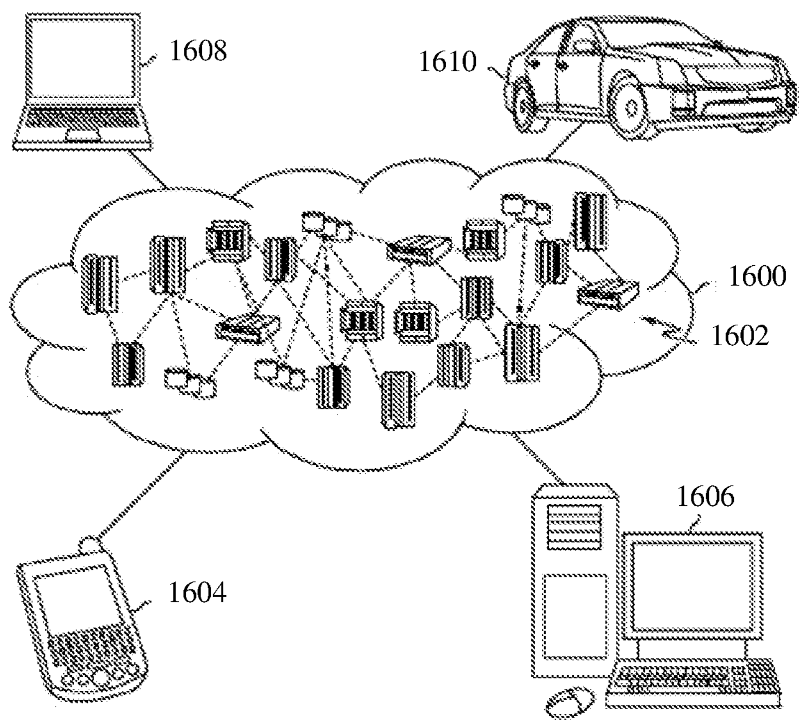
FIG. 16

1700

QUANTUM-ENHANCED FEATURES FOR CLASSICAL MACHINE LEARNING

BACKGROUND

The subject disclosure relates to machine learning, and more specifically to quantum-enhanced features for classical machine learning.

Quantum computing has shown promise in addressing classically-intractable computation problems. Currently, state-of-the-art quantum computing devices are considered as Noisy Intermediate-Scale Quantum (NISQ) devices. Such a quantum computing device implements a small number of error-prone qubits, less than the hundreds or thousands thought to be needed to implement error correction of a single logical qubit given current error rates of physical qubits. Unfortunately, full realization of fault tolerant, error corrected quantum computers will require devices that implement thousands or even millions of physical qubits. Thus, state-of-the-art quantum computing devices cannot yet support enough qubits to solve many classically-intractable computation problems of interest. Indeed, because quantum computing is in its nascency, well-established classical computing techniques are still widely-used in various technical fields. Thus far, quantum computing research focuses heavily on physically building quantum computing devices that can implement larger numbers of qubits. In contrast, limited quantum computing research focuses on how existing quantum computing devices can be leveraged to improve the performance of classical computing techniques. Thus, the present inventors have observed that systems and/or techniques that can address this technical problem can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that can facilitate quantum-enhanced features for classical machine learning are described.

According to one or more embodiments, a system is provided. The system can comprise a memory that can store computer-executable components. The system can further comprise a processor that can be operably coupled to the memory and that can execute the computer-executable components stored in the memory. In various embodiments, the computer-executable components can comprise a receiver component that can access a classical dataset. In various aspects, the computer-executable components can further comprise a feature component that can generate one or more machine learning input features based on a quantum transformation of the classical data set. In various embodiments, the computer-executable components can further comprise a conversion component that can convert the classical dataset into a set of quantum probability amplitudes. In various instances, the computer-executable components can further comprise a quantum component that can execute a quantum circuit on the set of quantum probability amplitudes, thereby yielding the quantum transformation of the classical dataset. In various cases, the computer-executable components can further comprise an execution component that can execute a classical machine learning model on the one or more machine learning input features.

According to one or more embodiments, the above-described system can be implemented as a computer-implemented method and/or computer program product.

According to one or more embodiments, a system is provided. The system can comprise a memory that can store computer-executable components. The system can further comprise a processor that can be operably coupled to the memory and that can execute the computer-executable components stored in the memory. In various embodiments, the computer-executable components can comprise a receiver component that can receive a classical timeseries dataset from an operator device. In various aspects, the computer-executable components can further comprise a feature component that can generate one or more quantum-enhanced machine learning input features based on a quantum transformation of the classical timeseries dataset. In various embodiments, the computer-executable components can further comprise a conversion component that can generate quantum probability amplitudes based on the classical timeseries dataset. In various instances, the computer-executable components can further comprise a quantum component that can execute a quantum algorithm on the quantum probability amplitudes, thereby yielding the quantum transformation of the classical timeseries dataset. In various cases, the computer-executable components can further comprise an execution component that can transmit to the operator device the one or more quantum-enhanced machine learning input features.

According to one or more embodiments, the above-described system can be implemented as a computer-implemented method and/or computer program product.

DESCRIPTION OF THE DRAWINGS

FIGS. 13-14 illustrate flow diagrams of example, non-limiting computer-implemented methods that facilitate quantum-enhanced features for classical machine learning in accordance with one or more embodiments described herein.

FIG. 16 illustrates an example, non-limiting cloud computing environment in accordance with one or more embodiments described herein.

DETAILED DESCRIPTION

Figure 1:
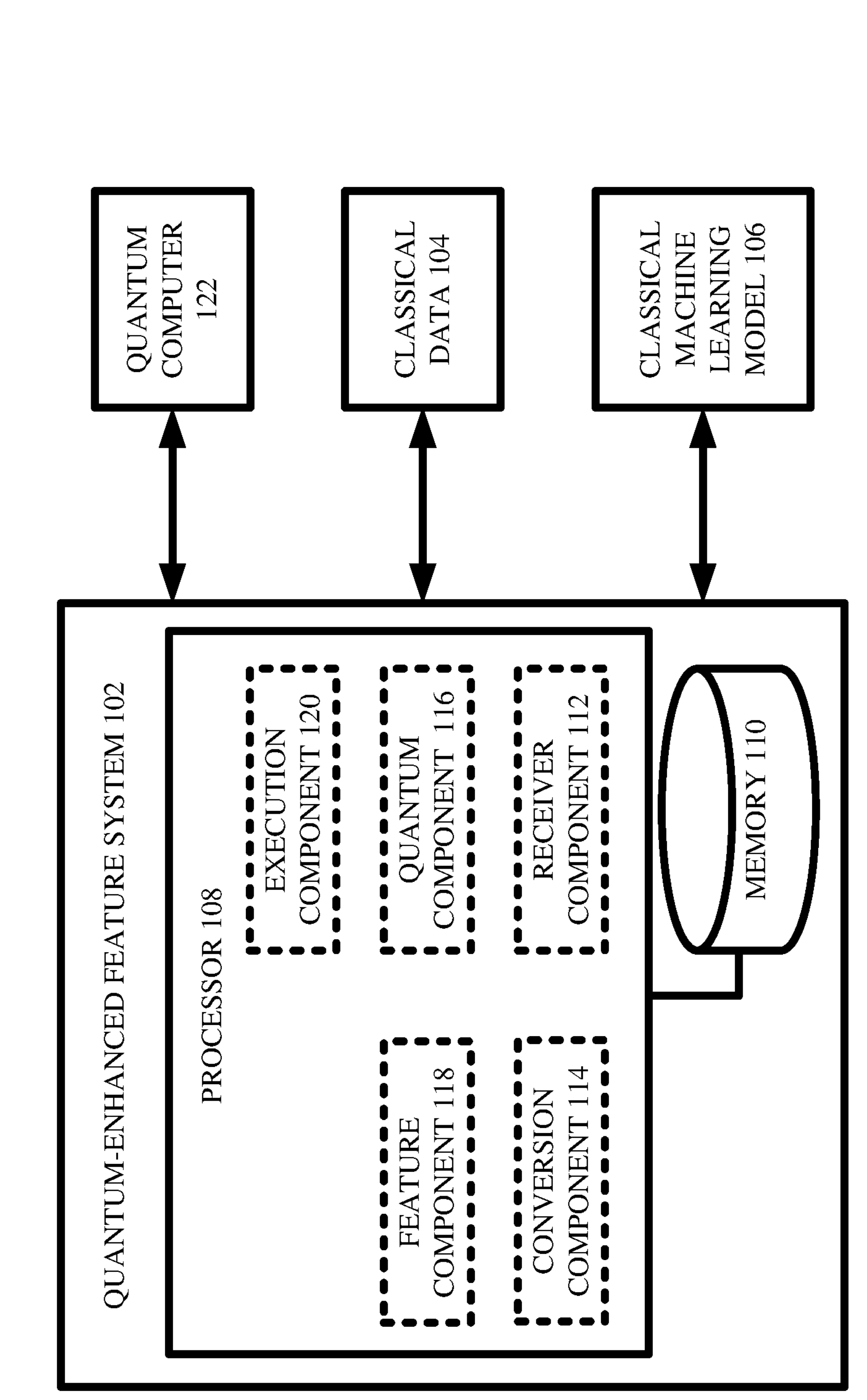
FIG. 1 illustrates a block diagram of an example, non-limiting system that facilitates quantum-enhanced features for classical machine learning in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As mentioned above, quantum computing has shown promise in addressing classically-intractable computation problems in various technical fields, such as computational chemistry, optimization, and machine learning. Currently, state-of-the-art quantum computing devices are called Noisy Intermediate-Scale Quantum (NISQ) devices. A NISQ device can physically implement less than the number of qubits required for error correction given the error rate of physical qubits. Unfortunately, full realization of error corrected quantum computers will require devices that implement thousands of, millions of, or even more qubits, which is many orders of magnitude above the numbers of qubits which can be supported by near-term systems. Thus, state-of-the-art quantum computing devices cannot yet physically support enough qubits to solve many classically-intractable computation problems of interest. Because quantum computing is still in its nascency (e.g., because the number of qubits that can be supported by NISQ devices is rather limited), well-established classical computing techniques remain widely-used in various technical fields.

One technical field in particular in which classical computational techniques are still heavily relied upon is machine learning (e.g., artificial intelligence). Various industries involve the logging of data, and such industries often utilize classical machine learning techniques (e.g., artificial neural networks, support vector machines, regression models, naive Bayes) to analyze such logged data. In such case, a set of classical data can be recorded and/or generated in any suitable fashion, the set of classical data can be fed as input to a machine learning ("ML") model, and the ML model can generate as output a label, classification, and/or prediction based on the set of classical data. For example, the set of classical data can be timeseries data (e.g., product/service sales recorded over time, resource consumption recorded over time, any other measured quantity of interest recorded over time), and it can be desired to forecast future data points based on the timeseries data. In such case, the timeseries data can be fed as input to a suitably-configured ML model, and the ML model can produce as output one or more forecasted data points based on the timeseries data (e.g., can predict how the timeseries data will continue and/or change at future time steps).

Thus far, much research has been conducted on constructing quantum computing devices that can physically support larger numbers of qubits. In contrast, limited research has been conducted on how the performance and/or capabilities of classical computing techniques in general, and classical ML techniques in particular, can be improved by existing quantum computing devices. Thus, systems and/or techniques that can address this technical problem can be desirable.

Various embodiments of the invention can address one or more of these technical problems. Specifically, various embodiments of the invention can provide systems and/or techniques that can facilitate quantum-enhanced features for classical machine learning. In various aspects, embodiments of the invention can be considered as a computerized tool (e.g., a combination of computer hardware and/or computer software) that can electronically receive as input a set of classical data, and that can electronically generate as output a set of ML input features based on a quantum transformation of the set of classical data. These ML input features can be referred to as quantum-enhanced input features and/or as quantum-enhanced independent variables. In other words, a computerized tool as described herein can transform the set of classical data via a quantum circuit and/or a quantum algorithm, and the result of such quantum transformation (as well as the original set of classical data) can be fed as input to a classical ML model. As described herein, a classical ML model that is configured to receive as input both the set of classical data and a quantum transformation of the set of classical data can exhibit a prediction/labeling accuracy that is higher in comparison to a classical ML model that is configured to receive only the set of classical data.

As mentioned above, a classical ML model can be configured to receive as input a set of classical data, and to produce as output a determination based on the set of classical data. For example, if the set of classical data is an image, the classical ML model can be configured such that the determination is a label that classifies and/or segments the image. As another example, if the set of classical data is an audio recording, the classical ML model can be configured such that the determination is a label that classifies and/or segments the audio recording. As yet another example, if the set of classical data is a timeseries, the classical ML model can be configured such that the determination is one or more forecasted data points that likely follow in the timeseries. Accordingly, at a high level, the classical ML model can be considered as detecting patterns, trends, and/or distributions that are exhibited by the set of classical data, where the determination generated by the classical ML model depends upon the detected patterns, trends, and/or distributions.

The inventors of various embodiments of the invention recognized that, in various cases, importing the set of classical data into a quantum Hilbert space (e.g., a complex-valued mathematical space that is native to quantum computing) and/or performing various quantum transformations on the set of classical data in the quantum Hilbert space can reveal additional patterns, trends, and/or distributions in the set of classical data, which additional patterns, trends, and/or distributions were previously hidden from and/or otherwise undetectable by the classical ML model. In other words, the inventors of various embodiments of the invention recognized that the set of classical data can be enriched/enhanced by converting the set of classical data into quantum state information and/or by transforming such quantum state information with quantum circuits/algorithms. So, if the classical ML model is configured to receive only the set of classical data, the classical ML model can have no access to the additional patterns, trends, and/or distributions that are hidden within the set of classical data. On the other hand, if the classical ML model is configured to receive both the set of classical data and a quantum transformation of the set of classical data, the classical ML model can have access to the additional patterns, trends, and/or distributions hidden within the set of classical data, which can help to improve the accuracy/precision of the determination generated by the classical ML model.

Accordingly, a computerized tool as described herein can, in various aspects, generate quantum-enhanced input features for classical ML models based on classical data. Specifically, in various embodiments, such a computerized tool can comprise a receiver component, a conversion component, a quantum component, a feature component, and an execution component.

In various embodiments, the receiver component can electronically receive and/or otherwise electronically access a classical dataset, which is desired to be analyzed by a classical ML model. In various cases, the receiver component can electronically retrieve the classical dataset from any suitable centralized and/or decentralized data structure (e.g., graph data structure, relational data structure, hybrid data structure), whether remote from and/or local to the receiver component. As those having ordinary skill in the art will appreciate, the classical dataset can be formatted in any suitable fashion (e.g., formatted as classical bits, formatted as classical integers, formatted as classical floating-point numbers).

In various embodiments, the conversion component can electronically import the classical dataset into a quantum Hilbert space. More specifically, the conversion component can electronically convert, via any suitable amplitude embedding and/or amplitude encoding technique, the classical dataset to a set of quantum probability amplitudes, where the set of quantum probability amplitudes collectively represent a quantum state vector, and where such quantum state vector can be operated on and/or otherwise manipulated by quantum circuits.

For example, suppose that the classical dataset contains x data points, for any suitable positive integer x. In such case, amplitude embedding/encoding can be applied, such that each of the x data points is converted to a corresponding quantum probability amplitude, thereby yielding x quantum probability amplitudes.

As those having ordinary skill in the art will appreciate, a quantum probability amplitude can be a complex number (e.g., having a real part and/or an imaginary part) associated with a quantum state, where the square of the quantum probability amplitude represents a probability of occurrence of the associated quantum state. Accordingly, quantum probability amplitudes can be normalized, such that the sum of the squares of the quantum probability amplitudes equals 1 (e.g., each quantum probability amplitude corresponds to a quantum state, each squared quantum probability amplitude represents the probability of its corresponding quantum state occurring, and so summing such probabilities over all possible states of a system equates to unity).

In particular, the conversion component can convert the classical dataset to quantum probability amplitudes by considering the classical dataset as an x-element vector, by computing the norm (e.g., magnitude, length) of that x-element vector (e.g., square root of the sum of the squares of each of the x data points), and by dividing each of the x data points by the computed norm. In various aspects, the result can be that the x data points are normalized such that the sum of their squares now equates to unity, and so each of the normalized x data points can be considered as a quantum probability amplitude. In various aspects, the set of quantum probability amplitudes can be considered as a quantum-version and/or a quantum-format of the classical dataset.

In various instances, the quantum component can electronically apply and/or otherwise electronically facilitate the application of a quantum circuit to the set of quantum probability amplitudes. Specifically, a quantum circuit can be a sequence of quantum gates (e.g., unitary matrix operators that transform/rotate the states of qubits) that are combined in series (e.g., via matrix multiplication) and/or in parallel (e.g., via tensor products and/or Kronecker products). A quantum circuit can be executed on a quantum computing device that comprises physical qubits. In various aspects, the quantum component can be electronically integrated with a quantum computing device and can thus execute any suitable quantum gates and/or quantum circuits that are compatible with the quantum computing device.

In various cases, the quantum component can initialize the quantum computing device with the quantum probability amplitudes generated by the conversion component. That is, the set of quantum probability amplitudes can collectively represent a quantum state vector, and the quantum component can execute any suitable initialization circuit on the quantum computing device so as to put the states of the qubits of the quantum computing device in accordance with the quantum state vector. Those having ordinary skill in the art will appreciate that the composition of such an initialization circuit can depend upon the particular values of the set of quantum probability amplitudes.

In various instances, once the qubits of the quantum computing device are initialized with the set of quantum probability amplitudes, the quantum component can execute a quantum circuit on the quantum computing device, thereby transforming the set of quantum probability amplitudes into a set of resultant quantum probability amplitudes. In various cases, the set of resultant quantum probability amplitudes can represent a resultant quantum state vector of the qubits of the quantum computing device. In various aspects, the set of resultant quantum probability amplitudes (e.g., the resultant quantum state vector) can be considered as a quantum-transformed version and/or a quantum-transformed format of the classical dataset.

Consider again the above example where the classical dataset contains x data points, and where the conversion component generates x quantum probability amplitudes based on the x data points. As those having ordinary skill in the art will appreciate, the set of x quantum probability amplitudes can be considered as an x-element quantum state vector that describes a superposition of quantum states of $\log_2 x$ qubits. Thus, the quantum computing device employed by the quantum component can comprise $\log_2 x$ qubits. If $\log_2 x$ is not an integer, it can be rounded up to the next larger integer.

In various cases, the $\log_2 x$ qubits can begin by having a known quantum state vector. For instance, the $\log_2 x$ qubits can begin by all being in the 10) state. Given the known beginning quantum state vector, the quantum component can execute an initialization circuit on the quantum computing device such that the states of the $\log_2 x$ qubits are transformed from the known beginning quantum state vector to the quantum state vector represented by the x quantum probability amplitudes. As those having ordinary skill in the art will appreciate, the composition of the initialization circuit (e.g., the particular combination and/or arrangement of quantum gates in the initialization circuit) can be chosen and/or selected by the quantum component based on the known beginning quantum state vector and based on the quantum state vector represented by the set of x quantum probability amplitudes. In other words, when given a starting quantum state vector and a desired quantum state vector, those having ordinary skill in the art will understand how to combine which quantum gates so as to transform the starting quantum state vector to the desired quantum state vector.

Once the $\log_2 x$ qubits of the quantum computing device are initialized with the quantum state vector represented by the x quantum probability amplitudes generated by the conversion component, the quantum component can execute any suitable quantum circuit on the quantum computing device. In some cases, the quantum circuit can be the Quantum Fourier Transform. In any case, the quantum circuit can transform and/or rotate the quantum state vector represented by the x quantum probability amplitudes to some resultant quantum state vector represented by x resultant quantum probability amplitudes.

In various embodiments, the feature component can electronically generate quantum-enhanced ML input features based on the set of resultant quantum probability amplitudes generated by the quantum component. Specifically, the set of resultant quantum probability amplitudes can be considered as a set of complex numbers, and the feature component can electronically apply any suitable mathematical functions to the set of complex numbers. In various cases, the result of application of such mathematical functions can be considered as the quantum-enhanced ML input features. For instance, the feature component can, in some cases, multiplicatively scale (e.g., scale up and/or down) the set of resultant quantum probability amplitudes, such that the scaled amplitudes can be considered as the quantum-enhanced ML input features. In other cases, the feature component can additively offset (e.g., bias up and/or down) the set of resultant quantum probability amplitudes, such that the offset amplitudes can be considered as the quantum-enhanced ML input features. In still other cases, since the resultant quantum probability amplitudes can be complex numbers, the feature component can compute magnitudes of the resultant quantum probability amplitudes, such that the magnitudes can be considered as the quantum-enhanced ML input features. In various embodiments, the feature component can refrain from mathematically changing the resultant quantum probability amplitudes at all, such that the set of resultant quantum probability amplitudes can themselves be considered as the quantum-enhanced ML input features.

To continue the above example, the feature component can extract (e.g., with and/or without mathematical manipulation) the x resultant quantum probability amplitudes generated by the quantum component, thereby yielding x quantum-enhanced ML input features. For instance, in some cases, the x quantum-enhanced ML input features can be equal to the x resultant quantum probability amplitudes. In other cases, the x quantum-enhanced ML input features can be any suitable function of the x resultant quantum probability amplitudes.

In various embodiments, the execution component can electronically execute and/or can otherwise electronically facilitate the execution of the classical ML model on the classical dataset and/or on the quantum-enhanced ML input features generated by the feature component. In other words, after the feature component generates the quantum-enhanced ML input features, the execution component can electronically feed the classical dataset and/or the quantum-enhanced ML input features to the classical ML model. As explained above, the quantum-enhanced ML input features can be created by importing the classical dataset into a quantum Hilbert space (e.g., specifically, by converting the classical dataset into quantum probability amplitudes) and/or by transforming the classical dataset in the quantum Hilbert space (e.g., specifically, by initializing a quantum computer with the quantum probability amplitudes and by then executing a quantum circuit on the quantum computer). Thus, the quantum-enhanced ML input features can exhibit patterns, trends, and/or distributions that characterize the classical dataset but that were previously hidden in the classical dataset. Accordingly, because the classical ML model can be configured to receive as input the quantum-enhanced ML input features, the classical ML model can base its outputted determination on such previously-hidden patterns, trends, and/or distributions. Therefore, the classical ML model can generate a more accurate determination than it could in the absence of the quantum-enhanced ML input features.

The computerized tool described herein can, in various aspects, electronically receive as input a classical dataset, and can electronically produce as output quantum-enhanced ML input features based on the classical dataset, where the quantum-enhanced ML input features can be considered as an enriched version of the classical dataset. As explained herein, the computerized tool can facilitate this functionality by electronically converting the classical dataset to quantum probability amplitudes (e.g., via amplitude embedding/encoding), by initializing a quantum computer with such quantum probability amplitudes, and/or by executing a quantum circuit (e.g., Quantum Fourier Transform) on the quantum computer so as to rotate and/or transform such quantum probability amplitudes. In some cases, the rotated/transformed quantum probability amplitudes can be considered as the quantum-enhanced ML input features. In other cases, the rotated/transformed quantum probability amplitudes can be further manipulated via any suitable mathematical function (e.g., scaling, offset, norm computation) so as to yield the quantum-enhanced ML input features. In various cases, the computerized tool can electronically execute a classical ML model on the quantum-enhanced ML input features, and/or can otherwise electronically store and/or transmit the quantum-enhanced ML input features.

Various embodiments of the invention can be employed to use hardware and/or software to solve problems that are highly technical in nature (e.g., to facilitate quantum-enhanced features for classical machine learning), that are not abstract and that cannot be performed as a set of mental acts by a human. Further, some of the processes performed can be performed by a specialized computer (e.g., amplitude embedder, quantum computer, classical machine learning model). In various aspects, some defined tasks associated with various embodiments of the invention can include:

accessing, by a device operatively coupled to a processor, a classical dataset; generating, by the device, one or more machine learning input features based on a quantum transformation of the classical dataset; and executing, by the device, a classical machine learning model on the one or more machine learning input features. Further defined tasks associated with various embodiments of the invention can include: converting, by the device, the classical dataset into a set of quantum probability amplitudes; and executing, by the device, a quantum circuit on the set of quantum probability amplitudes, thereby yielding the quantum transformation of the classical dataset. Such defined tasks are not typically performed manually by humans. Moreover, neither the human mind nor a human with pen and paper can electronically access a classical dataset, electronically convert the classical dataset to quantum probability amplitudes, electronically execute a quantum circuit on the quantum probability amplitudes to generate quantum-enhanced input features, and/or electronically execute a classical ML model on the quantum-enhanced input features. Instead, various embodiments of the invention are inherently and inextricably tied to computer technology and cannot be implemented outside of a computing environment (e.g., quantum circuits and classical ML models are inherently computerized objects that cannot exist outside of computing systems; likewise, a computerized tool that leverages quantum circuits to create enriched input features for classical ML models is also an inherently computerized device that cannot be practicably implemented in any sensible way without computers).

In various instances, embodiments of the invention can integrate into a practical application the disclosed teachings regarding quantum-enhanced features for classical machine learning. Indeed, as described herein, various embodiments of the invention, which can take the form of systems and/or computer-implemented methods, can be considered as a computerized tool that facilitates the enrichment of a classical dataset by generating a quantum state representation of the classical dataset and/or by transforming the quantum state representation via quantum circuits. As explained above, much quantum research has been dedicated to the design and/or construction of quantum computing devices that can support more physical qubits than NISQ devices, but no research has been dedicated to investigating how NISQ devices can be leveraged to improve the performance of classical machine learning techniques. In stark contrast, the inventors of various embodiments of the invention recognized that applying quantum transformations to a classical dataset can yield an enhanced/enriched version of the classical dataset. Furthermore, the inventors of various embodiments of the invention experimentally verified that a classical ML model which is configured to receive as input both the classical dataset and the enhanced/enriched version of the classical dataset can achieve higher performance metrics (e.g., increased prediction accuracy), as compared to a classical ML model which is configured to receive as input only the classical dataset. As explained herein, this improvement in performance metrics can be due to the fact that the enhanced/enriched version of the classical dataset can exhibit data patterns, data trends, and/or data distributions which are hidden and/or undetectable in the classical dataset. Thus, a classical ML model that is configured to receive as input the enhanced/enriched version of the classical dataset can base its outputted determination on such previously-hidden data patterns, data trends, and/or data distributions. Systems and/or techniques that can improve the very performance of computing devices such as classical ML models clearly constitute a concrete and tangible technical improvement in the field of machine learning.

Furthermore, various embodiments of the invention can control tangible, hardware-based, and/or software-based devices based on the disclosed teachings. For example, embodiments of the invention can actually execute, on tangible quantum hardware, quantum circuits so as to enhance/enrich classical data, and/or can actually facilitate the execution of tangible ML hardware on the enhanced/enriched classical data.

It should be appreciated that the figures and the herein disclosure describe non-limiting examples of various embodiments of the invention.

FIG. 1 illustrates a block diagram of an example, non-limiting system 100 that can facilitate quantum-enhanced features for classical machine learning in accordance with one or more embodiments described herein. As shown, a quantum-enhanced feature system 102 can be electronically integrated, via any suitable wired and/or wireless electronic connections, with classical data 104, with a classical machine learning model 106 ("classical ML model 106"), and/or with a quantum computer 122.

In various aspects, the classical data 104 can include any suitable classical data values (e.g., classical bits, classical integers, classical floating point numbers). In some cases, the classical data 104 can be timeseries data. That is, the data values of the classical data 104 can be collated by time (e.g., the classical data 104 can include one or more first data values that are associated with a first time step, the classical data 104 can include one or more second data values that are associated with a second time step). In various instances, the classical data 104 can have any suitable size (e.g., can have any suitable number of data elements/values; if collated by time, can have any suitable number of time steps). In various cases, the classical data 104 can represent measured values of any suitable quantity of interest, either recorded over time or recorded at any given instant in time (e.g., number of transactions recorded over time, data characterizing transactions that occurred during a snapshot in time, amount of resources consumed over time, data characterizing resources that were consumed during a snapshot in time). Although some herein examples describe various embodiments of the invention with respect to timeseries data, those having ordinary skill in the art will appreciate that this is a mere non-limiting example. In various aspects, any suitable set of classical data can be implemented in various embodiments of the invention, whether or not the set of classical data is organized as a timeseries (e.g., even if the set of classical data is collated by position, location, and/or some other index/identifier that is not time).

In various instances, the classical ML model 106 can implement any suitable type of classical machine learning algorithm, technique, and/or architecture. For instance, the classical ML model 106 can be and/or can comprise one or more support vector machines, one or more artificial neural networks, one or more expert systems, one or more Bayesian belief networks, one or more fuzzy logic models, one or more data fusion engines, one or more linear regression models, one or more polynomial regression models, one or more logistic regression models, one or more autoregressive integrated moving average models, and/or one or more decision trees. In various cases, the classical ML model 106 can be configured to receive any suitable type and/or dimensionality of input data and to generate any suitable type and/or dimensionality of output data based on the input data. In various aspects, the output data can be a determination, inference, classification, segmentation, and/or prediction that is based on the input data.

In various cases, the quantum computer 122 can be any suitable type of quantum computing device and/or quantum simulator. That is, the quantum computer 122 can exhibit any suitable quantum computing architecture.

In various instances, it can be desired to generate an enriched/enhanced version of the classical data 104, and it can be desired to execute the classical ML model 106 on the classical data 104 and/or on the enriched/enhanced version of the classical data 104. In various embodiments, this can be facilitated by the quantum-enhanced feature system 102, as described below. More specifically, the quantum-enhanced feature system 102 can leverage the quantum computer 122 so as to create the enriched/enhanced version of the classical data 104.

In various embodiments, the quantum-enhanced feature system 102 can comprise a processor 108 (e.g., computer processing unit, microprocessor) and a computer-readable memory 110 that is operably connected to the processor 108. The memory 110 can store computer-executable instructions which, upon execution by the processor 108, can cause the processor 108 and/or other components of the quantum-enhanced feature system 102 (e.g., receiver component 112, conversion component 114, quantum component 116, feature component 118, execution component 120) to perform one or more acts. In various embodiments, the memory 110 can store computer-executable components (e.g., receiver component 112, conversion component 114, quantum component 116, feature component 118, execution component 120), and the processor 108 can execute the computer-executable components.

In various embodiments, the quantum-enhanced feature system 102 can comprise a receiver component 112. In various aspects, the receiver component 112 can electronically retrieve and/or otherwise electronically access the classical data 104 from any suitable centralized and/or decentralized data structure (not shown), whether remote from and/or local to the receiver component 112. Accordingly, in various aspects, other components of the quantum-enhanced feature system 102 can manipulate and/or otherwise interact with (e.g., read, write, copy, edit) the classical data 104.

In various embodiments, the quantum-enhanced feature system 102 can comprise a conversion component 114. In various aspects, the conversion component 114 can electronically convert the classical data 104 (e.g., can convert an electronic copy of the classical data 104) into a quantum format. In other words, the classical data 104 can be in a classical format as is, meaning that the classical data 104 can be unamenable to processing by a quantum computing device. Thus, the conversion component 114 can electronically generate a version of the classical data 104 that can be processed by a quantum computing device.

Specifically, in various aspects, the conversion component 114 can generate, via any suitable amplitude embedding and/or amplitude encoding technique, a set of probability amplitudes based on the classical data 104. In various cases, the set of probability amplitudes can collectively be considered as a quantum state vector that represents the classical data 104. In other words, the set of probability amplitudes can be considered as a format and/or version of the classical data 104 that can be processed by a quantum computing device. In various instances, the set of probability amplitudes can respectively correspond to the classical data 104. That is, the conversion component 114 can generate one probability amplitude for each of the data elements in the classical data 104 (e.g., if the classical data 104 is a timeseries, the conversion component 114 can, in some cases, generate one probability amplitude for each of the time steps represented in the classical data 104). In particular, the conversion component 114 can, in various aspects, treat the classical data 104 as a vector of data elements, can compute the magnitude of such vector, and can divide each data element by that computed magnitude, thereby resulting in a normalized vector of data elements. In various cases, the normalized vector of data elements can be considered as the set of probability amplitudes.

Although the herein figures and disclosure describe various embodiments of the invention in which the conversion component 114 implements amplitude embedding in order to encode the classical data 104 into a quantum-processible format, this is a mere non-limiting example. In various aspects, any other suitable quantum embedding technique can be implemented to convert the classical data 104 into a form that is amenable to quantum computation (e.g., the conversion component 114 can implement basis embedding).

In various embodiments, the quantum-enhanced feature system 102 can comprise a quantum component 116. In various aspects, the quantum component 116 can electronically apply a quantum circuit to the set of probability amplitudes, thereby generating a set of resultant probability amplitudes. More specifically, in various embodiments, the quantum component 116 can be electronically integrated (e.g., via any suitable wired and/or wireless electronic connection) with the quantum computer 122, which can be any suitable quantum computing device and/or simulator. In various cases, as shown, the quantum computer 122 can be remote from the quantum component 116. However, in other cases, the quantum computer 122 can be local to the quantum component 116. In various instances, the quantum computer 122 can comprise physical qubits and/or can otherwise simulate the behavior of qubits, such that the quantum computer 122 can perform quantum computations. In various cases, the quantum component 116 can initialize the quantum computer 122 with the set of probability amplitudes, and can then execute any suitable quantum circuit (e.g., Quantum Fourier Transform) on the quantum computer 122, thereby transforming and/or rotating the set of probability amplitudes into the set of resultant probability amplitudes.

In other words, the set of probability amplitudes can be considered as a quantum state vector representing the classical data 104. In various aspects, the quantum component 116 can initialize the quantum computer 122 with such quantum state vector. That is, the quantum component 116 can manipulate (e.g., via any suitable quantum gates) the qubits of the quantum computer 122, such that the initial states of the qubits are in accordance with the probability amplitudes. In various instances, the quantum component 116 can then transform/rotate that quantum state vector (e.g., the probability amplitudes) by executing the quantum circuit on the quantum computer 122. The result can be a resultant quantum state vector (e.g., resultant probability amplitudes).

In various cases, the conversion component 114 can be considered as importing the classical data 104 into a quantum Hilbert space (e.g., can convert the classical data 104 into a quantum-processible format), and the quantum component 116 can be considered as manipulating the classical data 104 in the quantum Hilbert space (e.g., can transform and/or rotate the quantum-processible format of the classical data 104 via execution of quantum gates).

In various embodiments, the quantum-enhanced feature system 102 can comprise a feature component 118. In various aspects, the feature component 118 can electronically generate a set of enhanced ML input features based on the resultant probability amplitudes generated by the quantum component 116. In various instances, the feature component 118 can apply any suitable mathematical functions to the resultant probability amplitudes, thereby yielding the enhanced ML input features. For example, in some cases, the feature component 118 can multiplicatively scale the resultant probability amplitudes upward (e.g., by a multiplicative factor greater than 1) and/or downward (e.g., by a multiplicative factor less than 1), and such scaled probability amplitudes can be considered as the enhanced ML input features. As another example, in some cases, the feature component 118 can additively offset the resultant probability amplitudes upward (e.g., by adding a bias value) and/or downward (e.g., by subtracting a bias value), and such offset probability amplitudes can be considered as the enhanced ML input features. As yet another example, the resultant probability amplitudes can be complex numbers, and so the feature component 118 can compute the norm of each resultant probability amplitude, such that the computed magnitudes can be considered as the enhanced ML input features. As still a further example, the feature component 118 can refrain from changing the resultant probability amplitudes, such that the resultant probability amplitudes can themselves be considered as the enhanced ML input features.

In various embodiments, the quantum-enhanced feature system 102 can comprise an execution component 120. In various aspects, the execution component 120 can electronically execute and/or can otherwise electronically facilitate the execution of the classical ML model 106 on the enhanced ML input features generated by the feature component 118. That is, the execution component 120 can electronically feed the enhanced ML input features to the classical ML model 106, and/or can otherwise electronically instruct the classical ML model 106 to analyze the enhanced ML input features. In some cases, the execution component 120 can electronically train (e.g., via supervised training, unsupervised training, reinforcement learning) and/or can otherwise electronically facilitate the training of the classical ML model 106 on the enhanced ML input features.

Figure 2:
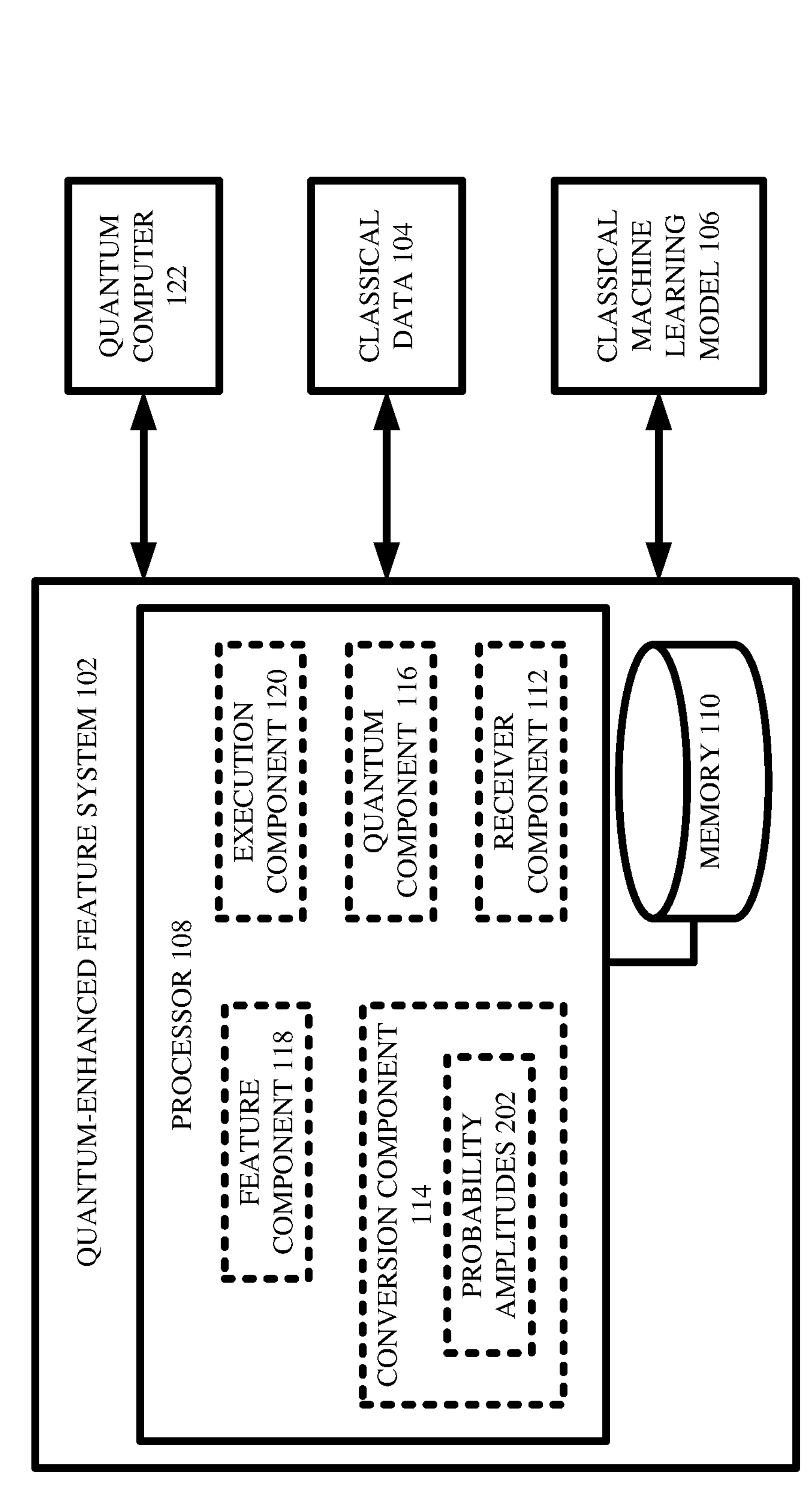
FIGS. 2-3 illustrate block diagrams of example, non-limiting systems including quantum probability amplitudes that facilitate quantum-enhanced features for classical machine learning in accordance with one or more embodiments described herein.
Figure 3:
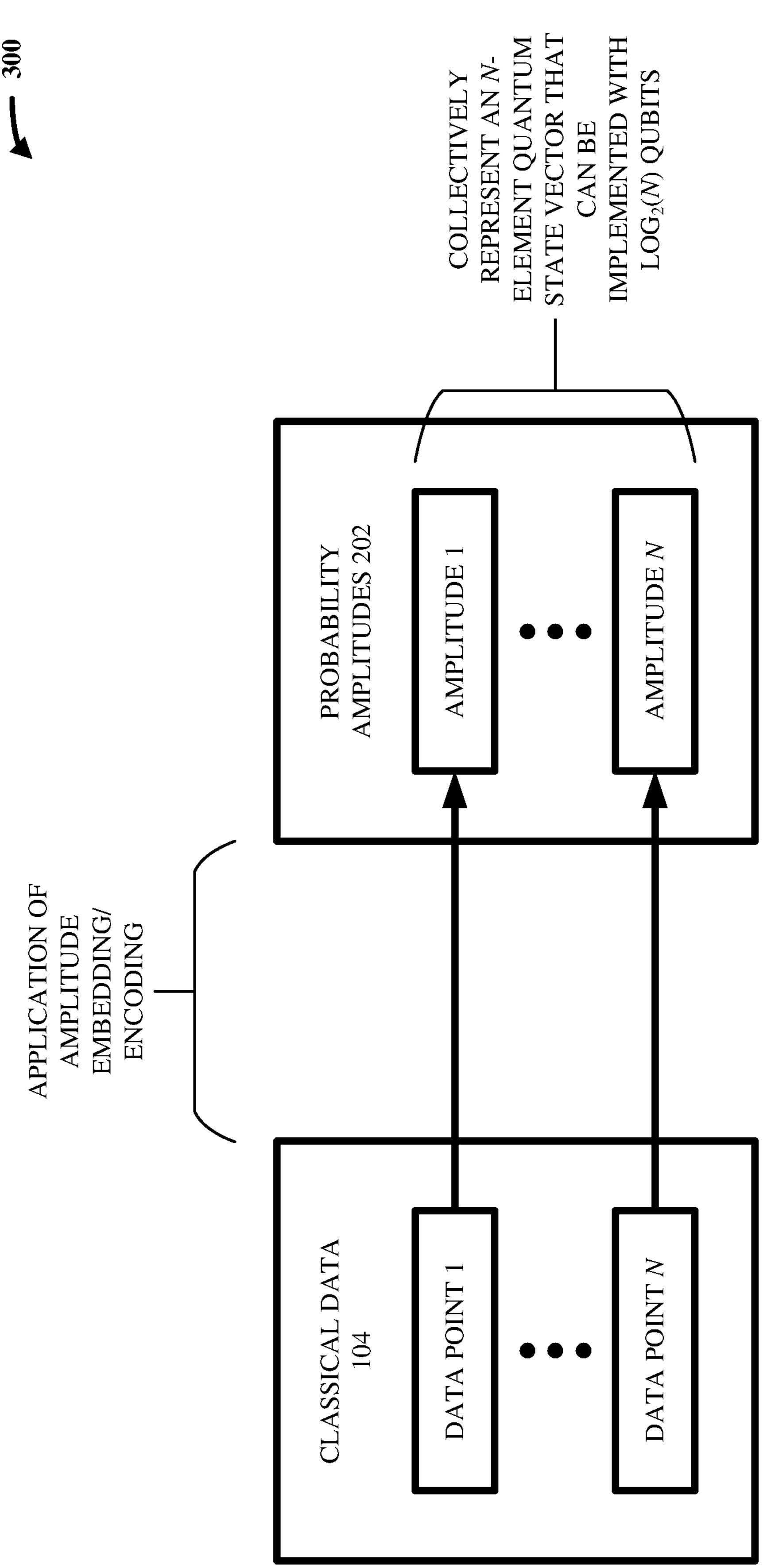

FIGS. 2-3 illustrate block diagrams of example, non-limiting systems 200 and 300 including quantum probability amplitudes that can facilitate quantum-enhanced features for classical machine learning in accordance with one or more embodiments described herein. As shown, the system 200 can, in various embodiments, comprise the same components as the system 100, and can further comprise probability amplitudes 202.

In various aspects, the conversion component 114 can electronically generate the probability amplitudes 202 based on the classical data 104. Specifically, in various instances, the conversion component 114 can electronically apply any suitable amplitude embedding technique and/or amplitude encoding technique to the classical data 104, thereby yielding the probability amplitudes 202. Amplitude embedding and/or amplitude encoding can be mathematical techniques by which classical data is embedded and/or encoded into the probability amplitudes of a quantum state vector. In other words, the probability amplitudes 202 can be a set of complex numbers whose values collectively represent the classical data 104, and whose squares represent the probabilities and/or likelihoods of occurrence of various quantum states. In other words, the probability amplitudes 202 can collectively be considered as a quantum-processible version and/or a quantum-processible format of the classical data 104 (e.g., the classical data 104 can be formatted in a way that cannot be processed by a quantum computer, but the probability amplitudes 202 can be formatted in a way that can be processed by a quantum computer).

More specifically, the conversion component 114 can, in various aspects, electronically generate the probability amplitudes 202 by normalizing the classical data 104. That is, the conversion component 114 can, in various instances, treat the classical data 104 as a vector of elements. In such case, the conversion component 114 can normalize that vector. In other words, the conversion component 114 can compute the norm (e.g., magnitude, length) of that vector, and can divide each of the elements in the vector by the computed norm. In various instances, the result can be a normalized vector. In various cases, the elements of the normalized vector can be considered as the probability amplitudes 202.

FIG. 3 illustrates, in a non-limiting and example way, how the conversion component 114 can generate the probability amplitudes 202 based on the classical data 104. As shown in FIG. 3, the classical data 104 can, in some cases, comprise n data points, for any suitable positive integer n (e.g., can comprise a data point 1 to a data point n). In various aspects, if the classical data 104 is a timeseries, this can indicate that the classical data 104 includes n time steps (e.g., the classical data 104 can comprise a data point for time 1, the classical data 104 can comprise a data point for time n). However, this is a mere non-limiting example. In some cases, if the classical data 104 is a timeseries, the classical data 104 can comprise more than one data point per time step. For example, if the classical data 104 comprises n data points in total, and if the classical data 104 is a timeseries that has two data points per time step, then the classical data 104 can include n/2 time steps. In any case, the classical data 104 can comprise n data points in total.

In various instances, as shown, the classical data 104 can respectively correspond to the probability amplitudes 202. That is, since the classical data 104 comprises n data points, the probability amplitudes 202 can likewise comprise n amplitudes (e.g., can comprise amplitude 1 to amplitude n). In various cases, each amplitude in the probability amplitudes 202 can be based on and/or otherwise generated from a corresponding data point in the classical data 104. For instance, the amplitude 1 can be based on and/or otherwise generated from the data point 1, and the amplitude n can be based on and/or otherwise generated from the data point n.

As mentioned above, the conversion component 114 can apply any suitable amplitude embedding/encoding technique to create the probability amplitudes 202. In some cases, one such technique can be normalization. For example, consider the classical data 104 as a vector (and/or a set) represented by the variable y. In such case, the data point 1 can be represented by $y_i$, and the data point n can be represented by $y_n$. In various instances, the conversion component 114 can calculate the norm of y as $$\sqrt{\sum_{i=1}^{n}(y_i^2)}.$$

Accordingly, the conversion component 114 can normalize y by dividing each element of y by the calculated norm. That is, $$y_{norm} = \frac{y}{\sqrt{\sum_{i=1}^{n}(y_i^2)}},$$

where $y_{norm}$ can be a vector (and/or a set) representing the probability amplitudes 202. In other words, the amplitude 1 can be equal to the quotient of the data point 1 and the norm of the classical data 104

$$\left(\text{e.g., } y_{norm,1} = \frac{y_1}{\sqrt{\sum_{i=1}^{n}(y_i^2)}}\right),$$

and the amplitude n can be equal to the quotient of the data point n and the norm of the $$\left(\text{e.g., } y_{norm,n} = \frac{y_n}{\sqrt{\sum_{i=1}^{n}(y_i^2)}}\right).$$

In various aspects, the probability amplitudes 202 can be considered as collectively representing an n-element quantum state vector. As those having ordinary skill in the art will appreciate, an n-element quantum state vector can be implemented by $\log_2$ n qubits. In various cases, if $\log_2$ n is not an integer, it can be rounded up to the next larger integer (e.g., since fractions of a qubit cannot be implemented). If $\log_2$ n is rounded up to the next larger integer, those having ordinary skill in the art will appreciate that one or more dummy values can be concatenated to the end (and/or to the beginning, and/or anywhere else) of the probability amplitudes 202. For example, suppose that n=5. In such case, the classical data 104 can have five data points, and five probability amplitudes can be computed as described above. However, $\log_2$ 5 is not an integer, and $\log_2$ 5 rounded up to the next larger integer is equal to 3. This can mean that the probability amplitudes 202 can be processed by a quantum computer having three qubits. However, the quantum state vector for a three-qubit system is defined by eight probability amplitudes (e.g., $2^3=8$), not by five probability amplitudes. Accordingly, the probability amplitudes 202 can have eight amplitudes in total, the first five of which can be generated as described above, and the last three of which can be dummy values which are not of interest.

Figure 4:
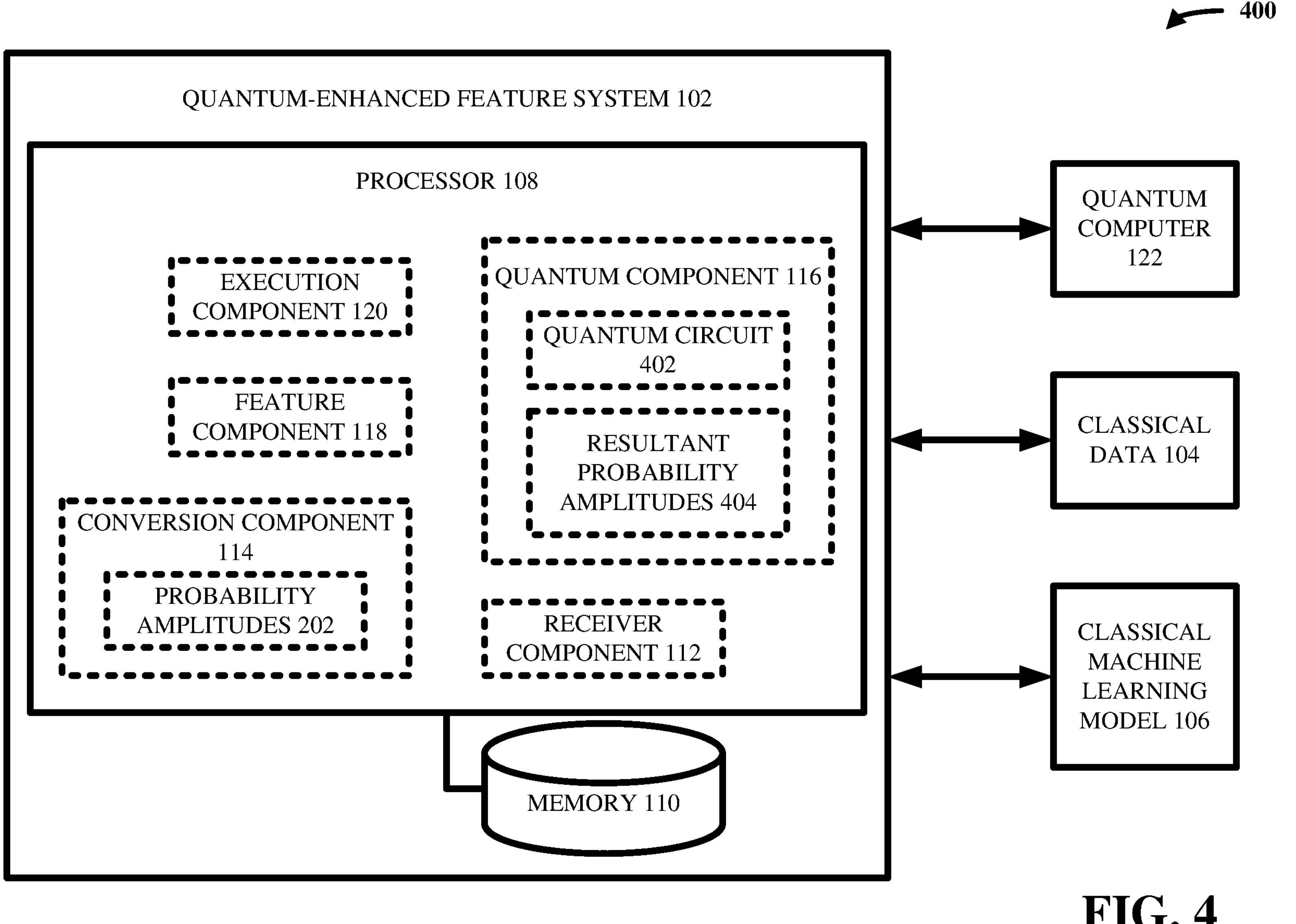
FIGS. 4-5 illustrate block diagrams of example, non-limiting systems including a quantum circuit and resultant quantum probability amplitudes that facilitate quantum-enhanced features for classical machine learning in accordance with one or more embodiments described herein.
Figure 5:
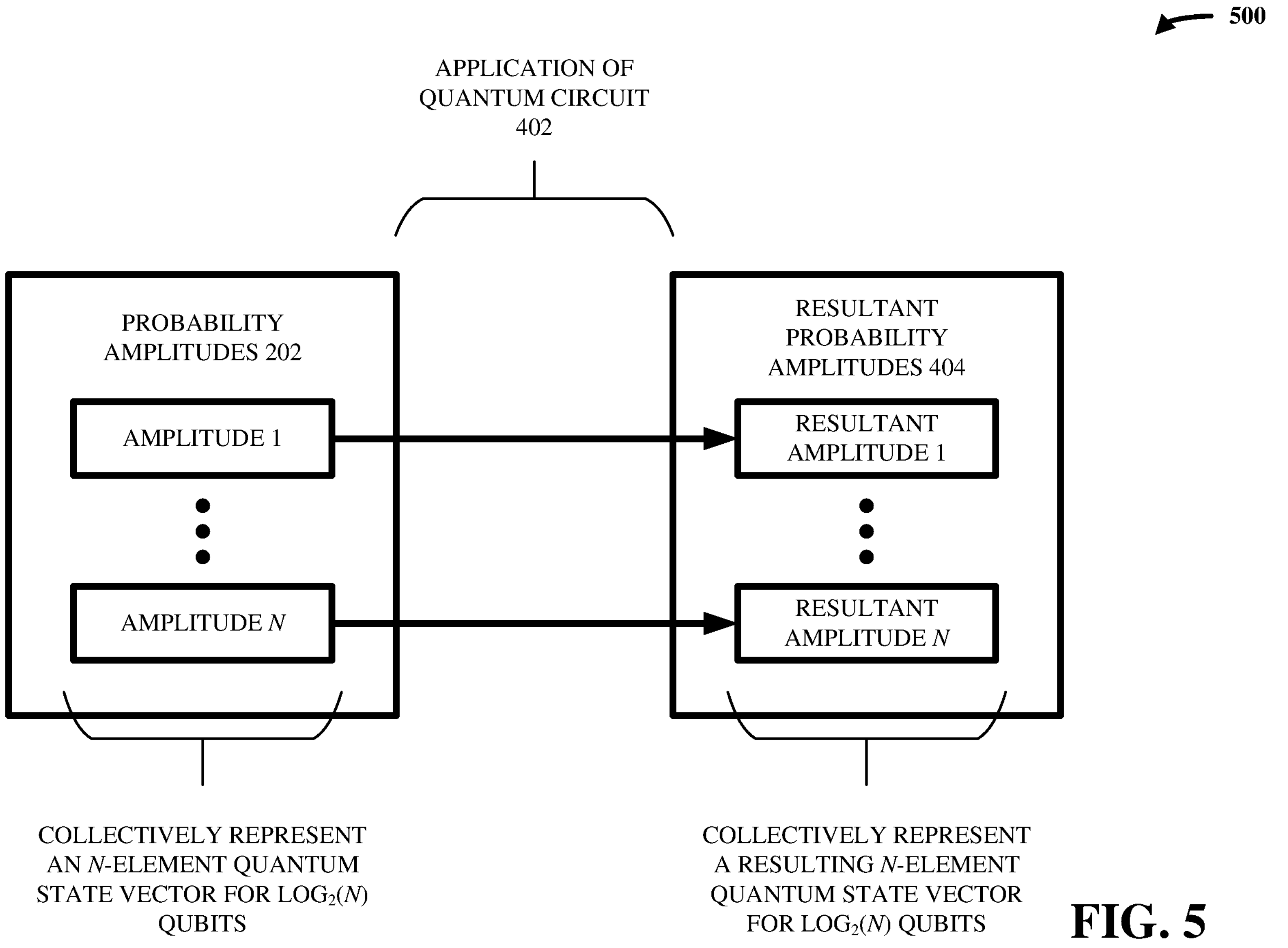

FIGS. 4-5 illustrate block diagrams of example, non-limiting systems 400 and 500 including a quantum circuit and resultant quantum probability amplitudes that can facilitate quantum-enhanced features for classical machine learning in accordance with one or more embodiments described herein. As shown, the system 400 can, in some cases, comprise the same components as the system 200, and can further comprise a quantum circuit 402 and resultant probability amplitudes 404.

In various aspects, the quantum component 116 can electronically apply the quantum circuit 402 to the probability amplitudes 202, thereby yielding the resultant probability amplitudes 404. More specifically, the quantum component 116 can be electronically integrated with and/or can otherwise have electronic access to and/or electronic control of the quantum computer 122. In various aspects, the quantum computer 122 can implement $\log_2$ n physical qubits and/or can otherwise simulate the behavior of $\log_2$ n qubits (e.g., again, if $\log_2$ n is not an integer, it can be rounded up). Accordingly, the quantum computer 122 can facilitate quantum computations of n-element quantum state vectors. In various cases, the quantum component 116 can electronically initialize the quantum computer 122 with the probability amplitudes 202. That is, the quantum component 116 can cause the qubits of the quantum computer 122 to enter a superposition of quantum states that is given by and/or in accordance with the probability amplitudes 202. After initialization, the quantum component 116 can electronically cause the quantum circuit 402 to be executed on the quantum computer 122. Because the quantum computer 122 can be initialized with the probability amplitudes 202, execution of the quantum circuit 402 can cause the probability amplitudes 202 to be rotated and/or transformed, thereby yielding the resultant probability amplitudes 404.

In various aspects, the quantum circuit 402 can include any suitable combination and/or arrangement of quantum gates. In some cases, the quantum circuit 402 can be a Quantum Fourier Transform.

FIG. 5 illustrates, in a non-limiting and example way, how the quantum component 116 can generate the resultant probability amplitudes 404 based on the probability amplitudes 202. As shown in FIG. 5, because the probability amplitudes 202 can have n amplitude values (e.g., amplitude 1 to amplitude n), the resultant probability amplitudes 404 can likewise have n amplitude values (e.g., resultant amplitude 1 to resultant amplitude n). Just as the probability amplitudes 202 can collectively represent an n-element quantum state vector for $\log_2$ n qubits, the resultant probability amplitudes 404 can likewise collectively represent a resulting n-element quantum state vector for $\log_2$ n qubits. In various aspects, when the quantum circuit 402 is applied to the probability amplitudes 202 (e.g., when the quantum circuit 402 is executed on the quantum computer 122 after the quantum computer 122 has been initialized with the probability amplitudes 202), the quantum circuit 402 can alter (e.g., rotate, transform) the probability amplitudes 202, and the result of such alteration can be considered as the resultant probability amplitudes 404. In other words, the quantum computer 122 can be initialized with an initial quantum state (e.g., the probability amplitudes 202), and execution of the quantum circuit 402 on the quantum computer 122 can convert the initial quantum state (e.g., the probability amplitudes 202) to a resulting quantum state (e.g., the resultant probability amplitudes 404).

Figure 6:
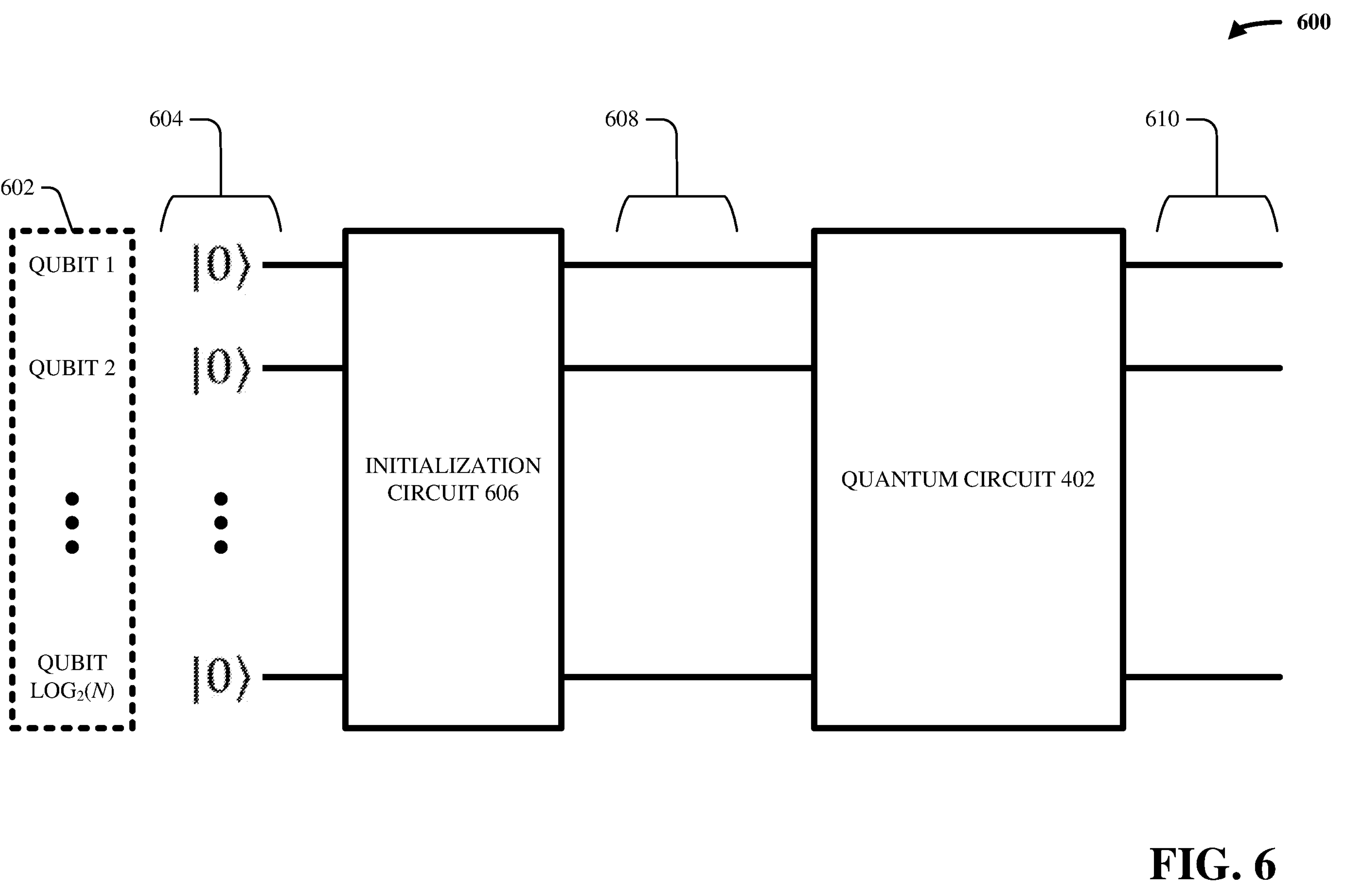
FIG. 6 illustrates an example, non-limiting quantum circuit diagram in accordance with one or more embodiments described herein.

This is further explained in FIG. 6. FIG. 6 illustrates an example, non-limiting quantum circuit diagram 600 in accordance with one or more embodiments described herein. The quantum circuit diagram 600 can illustrate how the quantum computer 122 employed by the quantum component 116 operates.

As shown, the quantum computer 122 can comprise $\log_2$ n qubits (e.g., qubit 1, qubit 2, . . . , qubit $\log_2$ n). Again, if $\log_2$ n is not an integer, it can be rounded up. In various instances, the $\log_2$ n qubits can begin with any suitable starting quantum states. In the non-limiting example shown, all of the $\log_2$ n qubits can begin by being in the |0> state, as indicated by numeral 604. However, this is a mere non-limiting example. In various other cases, the $\log_2$ n qubits can begin by being in any suitable known quantum states (e.g., all of the $\log_2$ n qubits can be in the |1> state, some of the $\log_2$ n qubits can be in the |0> state while others of the $\log_2$ n qubits can be in the |1> state). In any case, the $\log_2$ n qubits of the quantum computer 122 can begin at numeral 604 by being in some known quantum state (e.g., can have some known quantum state vector).

In various instances, the quantum component 116 can execute an initialization circuit 606 on the quantum computer 122. In various aspects, execution of the initialization circuit 606 can rotate and/or transform the quantum states of the $\log_2$ n qubits from the known beginning quantum state at numeral 604 to a quantum state defined by the probability amplitudes 202 at numeral 608. In other words, the initialization circuit 606 can comprise any suitable combination and/or arrangement of quantum gates (e.g., Hadamard gates, Phase, gates, Pauli-X gates, Pauli-Y gates, Pauli-Z gates, CNOT gates, SWAP gates, Toffoli gates), so as to cause the $\log_2$ n qubits to enter a quantum state defined by the probability amplitudes 202. As those having ordinary skill in the art will appreciate, the particular composition of the initialization circuit 606 can depend upon the known beginning quantum states at numeral 604 and upon the desired initial quantum states at numeral 608 (e.g., the probability amplitudes 202). In other words, when given a known quantum state and a desired quantum state, those having ordinary skill in the art understand which quantum gates to combine in which arrangement and/or order so as to convert the given known quantum state into the desired quantum state. Thus, when given the known beginning quantum states at numeral 604 and the desired initial quantum states at numeral 608 (e.g., the probability amplitudes 202), the quantum component 116 can determine how to structure the initialization circuit 606 so as to rotate/transform the known beginning quantum states at numeral 604 into the desired initial quantum states at numeral 608 (e.g., the probability amplitudes 202). Once the $\log_2$ n qubits exhibit quantum states that are in accordance with the probability amplitudes 202 (e.g., at numeral 608, after execution of the initialization circuit 606), the quantum computer 122 can be considered as having been initialized with the probability amplitudes 202.

In various aspects, once the quantum computer 122 is initialized with the probability amplitudes 202, the quantum component 116 can execute the quantum circuit 402 on the quantum computer 122. In various instances, execution of the quantum circuit 402 can rotate and/or transform the quantum states of the $\log_2$ n qubits from the quantum state defined by the probability amplitudes 202, at numeral 608, to some resultant quantum state, indicated at numeral 610. In various aspects, the resultant quantum state, at numeral 610, can correspond to the resultant probability amplitudes 404. In other words, the quantum circuit 402 can rotate/transform the probability amplitudes 202 (e.g., which define the quantum states of the $\log_2$ n qubits at numeral 608) into the resultant probability amplitudes 404 (e.g., which define the quantum states of the $\log_2$ n qubits at numeral 610). In various cases, the resultant probability amplitudes 404 can thus be considered as a function of the probability amplitudes 202 and of the quantum circuit 402.

Those having ordinary skill in the art will appreciate that the quantum computer 122 can implement any suitable quantum state measurement techniques.

Figure 7:
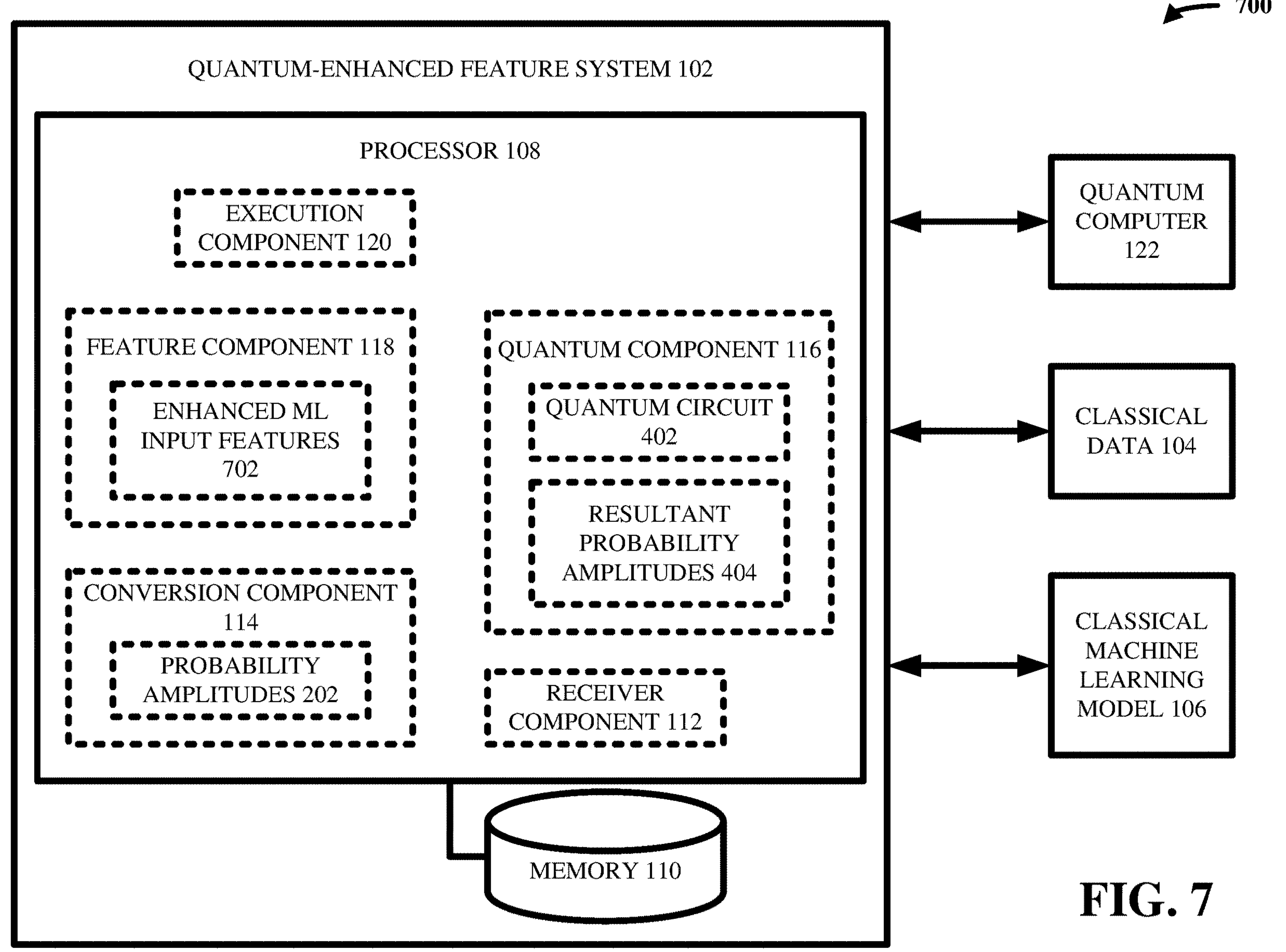
FIGS. 7-8 illustrate block diagrams of example, non-limiting systems including enhanced machine learning input features that facilitate quantum-enhanced features for classical machine learning in accordance with one or more embodiments described herein.
Figure 8:
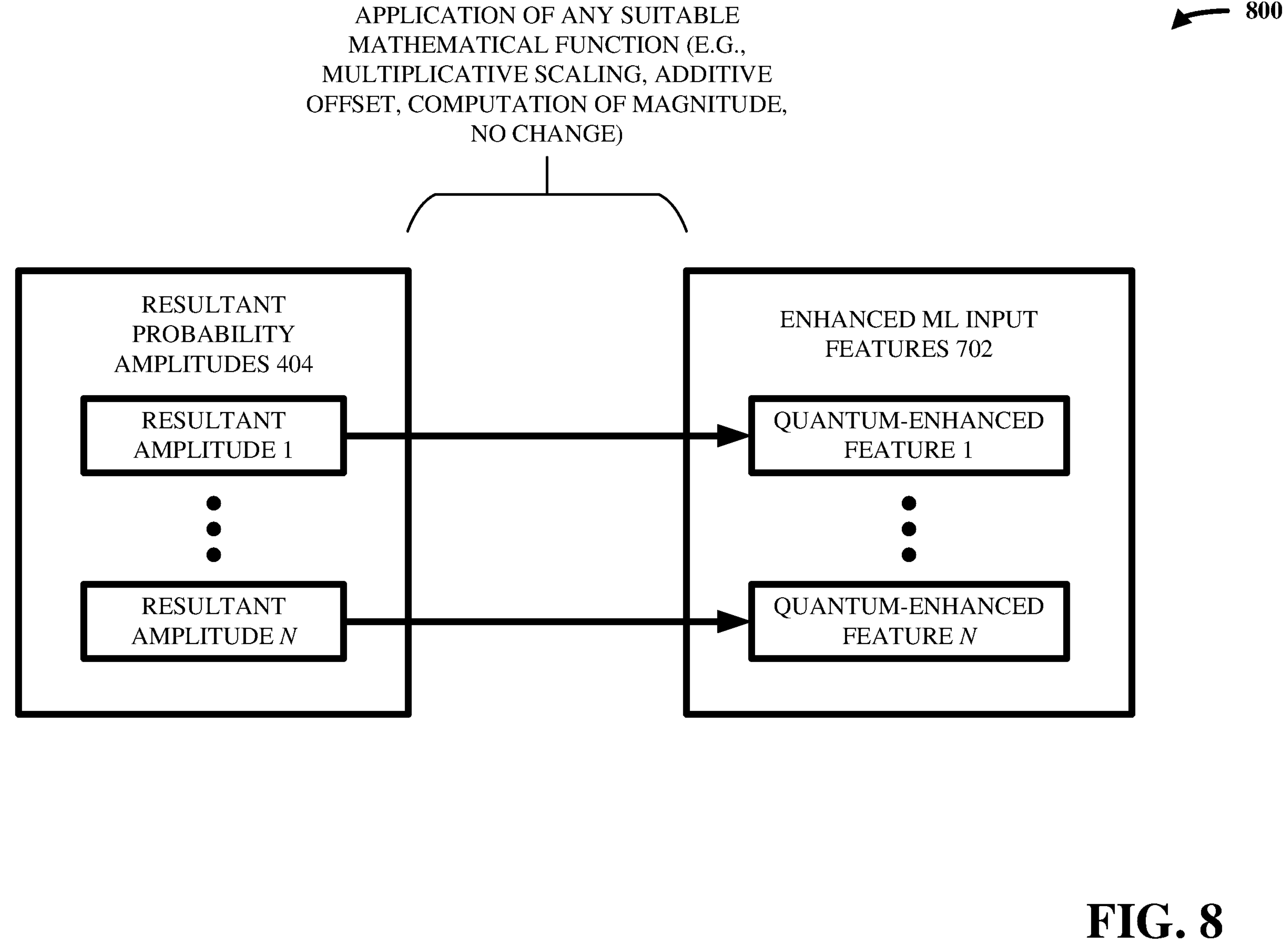

FIGS. 7-8 illustrate block diagrams of example, non-limiting systems 700 and 800 including enhanced machine learning input features that can facilitate quantum-enhanced features for classical machine learning in accordance with one or more embodiments described herein. As shown, the system 700 can, in some cases, comprise the same components as the system 400, and can further comprise enhanced ML input features 702.

In various aspects, the feature component 118 can electronically generate the enhanced ML input features 702 based on the resultant probability amplitudes 404. In other words, the feature component 118 can apply any suitable mathematical functions to the resultant probability amplitudes 404, thereby yielding the enhanced ML input features 702.

This is shown in a non-limiting and example way in FIG. 8. As shown in FIG. 8, because the resultant probability amplitudes 404 can comprise n amplitudes (e.g., resultant amplitude 1 to resultant amplitude n), the enhanced ML input features 702 can likewise comprise n quantum-enhanced input features (e.g., quantum-enhanced input feature 1 to quantum-enhanced input feature n). In various cases, the enhanced ML input features 702 can respectively correspond to the resultant probability amplitudes 404. That is, the quantum-enhanced feature 1 can correspond to and/or otherwise be generated based on the resultant amplitude 1, and the quantum-enhanced feature n can correspond to and/or otherwise be generated based on the resultant amplitude n.

In various cases, the enhanced ML input features 702 can be any suitable function of the resultant probability amplitudes 404. For example, in some instances, the feature component 118 can multiplicatively scale the resultant probability amplitudes 404 to generate the enhanced ML input features 702. In such case, the quantum-enhanced feature 1 can be equal to the product of the resultant amplitude 1 and any suitable multiplicative factor, and the quantum-enhanced feature n can likewise be equal to the product of the resultant amplitude n and any suitable multiplicative factor. As another example, in some aspects, the feature component 118 can additively offset the resultant probability amplitudes 404 to generate the enhanced ML input features 702. In such case, the quantum-enhanced feature 1 can be equal to the sum of the resultant amplitude 1 and any suitable bias value, and the quantum-enhanced feature n can likewise be equal to the sum of the resultant amplitude n and any suitable bias value. As still another example, sine the resultant probability amplitudes 404 can be complex numbers, the feature component 118 can compute magnitudes of the resultant probability amplitudes 404 to generate the enhanced ML input features 702. In such case, the quantum-enhanced feature 1 can be equal to the magnitude of the resultant amplitude 1, and the quantum-enhanced feature n can likewise be equal to the magnitude of the resultant amplitude n. In yet another example, the feature component 118 can refrain from altering the resultant probability amplitudes. In such case, the quantum-enhanced feature 1 can be equal to the resultant amplitude 1, and the quantum-enhanced feature n can likewise be equal to the resultant amplitude n.

In various instances, the enhanced ML input features 702 can be considered as a quantum-transformed and/or quantum-enriched version of the classical data 104. In various cases, the term “enhanced” and/or “enriched” can be used to describe the enhanced ML input features 702, because the enhanced ML input features 702 can exhibit data patterns, data trends, and/or data distributions that were previously hidden and/or undetectable in the classical data 104. As explained above, the inventors of various embodiments of the invention recognized that importing a classical dataset into a quantum Hilbert space and then transforming the classical dataset in the quantum Hilbert space can reveal otherwise hidden patterns, trends, and/or distributions that characterize the classical dataset. As described herein, the actions of the conversion component 114 can be considered as importing the classical data 104 into a quantum Hilbert space (e.g., the conversion component 114 can convert the classical data 104 into a quantum-processible format, namely the probability amplitudes 202), and the actions of the quantum component 116 can be considered as transforming the classical data 104 in the quantum Hilbert space (e.g., the quantum component 116 can apply a quantum circuit to the probability amplitudes 202). Accordingly, enhanced ML input features 702 can contain patterns, trends, and/or distributions that are not identifiable in the classical data 104.

Figure 9:
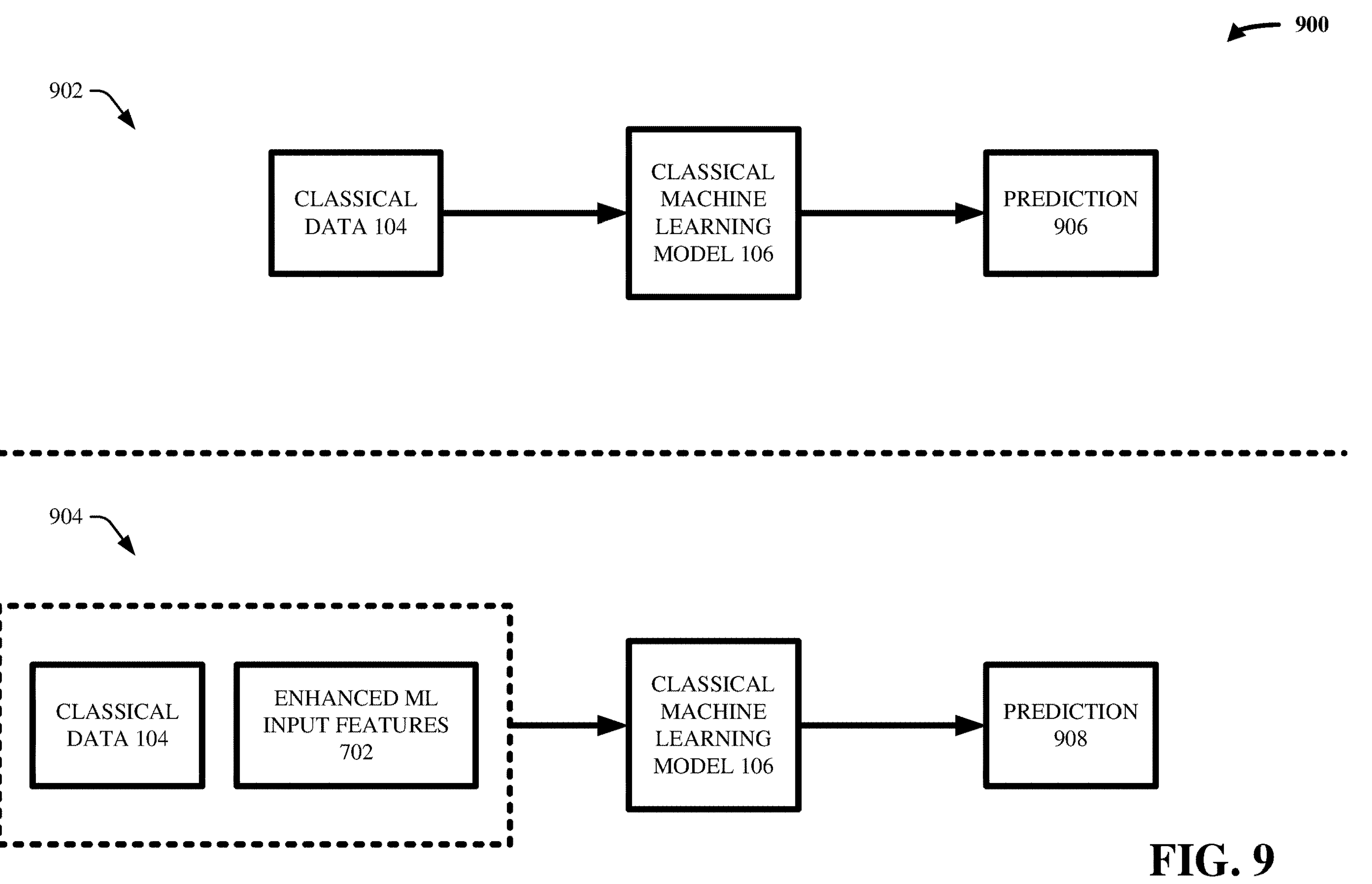
FIG. 9 illustrates an example, non-limiting block diagram that shows how quantum-enhanced features for classical machine learning can be practically utilized in accordance with one or more embodiments described herein.

In various embodiments, as mentioned above, the execution component 120 can electronically execute and/or can otherwise electronically facilitate the execution of the classical ML model 106 on the enhanced ML input features 702. This is illustrated in a non-limiting and example way in FIG. 9. FIG. 9 illustrates an example, non-limiting block diagram that shows how quantum-enhanced features for classical machine learning can be practicably utilized in accordance with one or more embodiments described herein.

As shown, FIG. 9 depicts two scenarios: a scenario 902, and a scenario 904. In the scenario 902, the classical ML model 106 can be configured to receive as input only the classical data 104, and to produce as output the prediction 906. On the other hand, in the scenario 904, the classical ML model 106 can be configured to receive as input both the classical data 104 and the enhanced ML input features 702, and to produce as output the prediction 908. As mentioned above, the classical ML model 106 can generate predictions/determinations by recognizing patterns, trends, and/or distributions in its input data. In the scenario 902, the classical ML model 106 is not configured to receive as input the enhanced ML input features 702, and thus the classical ML model 106 does not have access to the patterns, trends, and/or distributions that are exhibited by the enhanced ML input features 702 but that are hidden within the classical data 104. In contrast, in the scenario 904, the classical ML model 106 is configured to receive as input the enhanced ML input features 702, and thus the classical ML model 106 does have access to the patterns, trends, and/or distributions that are exhibited by the enhanced ML input features 702 but that are hidden within the classical data 104. Because the classical ML model 106 can have access to additional patterns, trends, and/or distributions in its input data in the scenario 904, the prediction 908 can be more accurate than the prediction 906. In other words, the performance of the classical ML model 106 can be improved when the classical ML model 106 is configured to receive as input the enhanced ML input features 702. Such an increase in performance (e.g., an increase in prediction/detection accuracy) is a concrete and tangible technical benefit.

Indeed, the inventors of various embodiments of the invention experimentally verified such benefits. Specifically, the inventors conducted various experiments using various volatility index data. In such experiments, the inventors compiled volatility index data (e.g., which can be considered as timeseries data) for various stocks, and fed such data to various classical ML models (e.g., such as an autoregressive integrated moving average model) that forecasted future volatility index values. The inventors computed the accuracy of such forecasts by comparing the forecasts to the known volatility index values that actually occurred at the forecasted time steps. Additionally, the inventors enhanced/enriched the compiled volatility index data as described herein with a Quantum Fourier Transform (e.g., in such experiments, the quantum circuit 402 was a Quantum Fourier Transform), and fed both the volatility index data and the QFT version of the volatility index data to the classical ML models, which again forecasted future volatility index values. As above, the inventors computed the accuracy of such forecasts by comparing the forecasts to the known volatility index values that actually occurred at the forecasted time steps. Finally, the inventors compared the accuracies of the forecasts that were based on only the compiled volatility index data to the accuracies of the forecasts that were based on both the compiled volatility index data and on the QFT version of the volatility index data.

In one experiment, forecasts that were based on both the compiled volatility index data for some first stock and on the QFT version of the volatility index data for that first stock achieved an accuracy that was 17.90% higher than the forecasts that were based on only the compiled volatility index data for that first stock. In a second experiment, forecasts that were based on both the compiled volatility index data for some second stock and on the QFT version of the volatility index data for that second stock achieved an accuracy that was 19.61% higher than the forecasts that were based on only the compiled volatility index data for that second stock. This is a significant improvement in the performance of such classical ML models.

In some other experiments, the inventors further computed the Fast Fourier Transform (FFT) of the compiled volatility index data for various stocks. In such cases, the inventors fed the classical ML models the compiled volatility index data, the QFT version of the volatility index data, and the FFT version of the volatility index data. In one of such cases, the classical ML models achieved a forecast accuracy that was 20.01% higher as compared to forecasts that were based only on the compiled volatility index data. In another such case, the classical ML models achieved a forecast accuracy that was 66.91% higher as compared to forecasts that were based only on the compiled volatility index data. Again, this is a significant improvement in the performance of such classical ML models.

In various aspects, the inventors of various embodiments of the invention noted that enhancing/enriching classical data as described herein can have a smoothing and/or noise-reduction effect on the classical data (e.g., at least when the classical data is transformed with a Quantum Fourier Transform).

Figure 10:
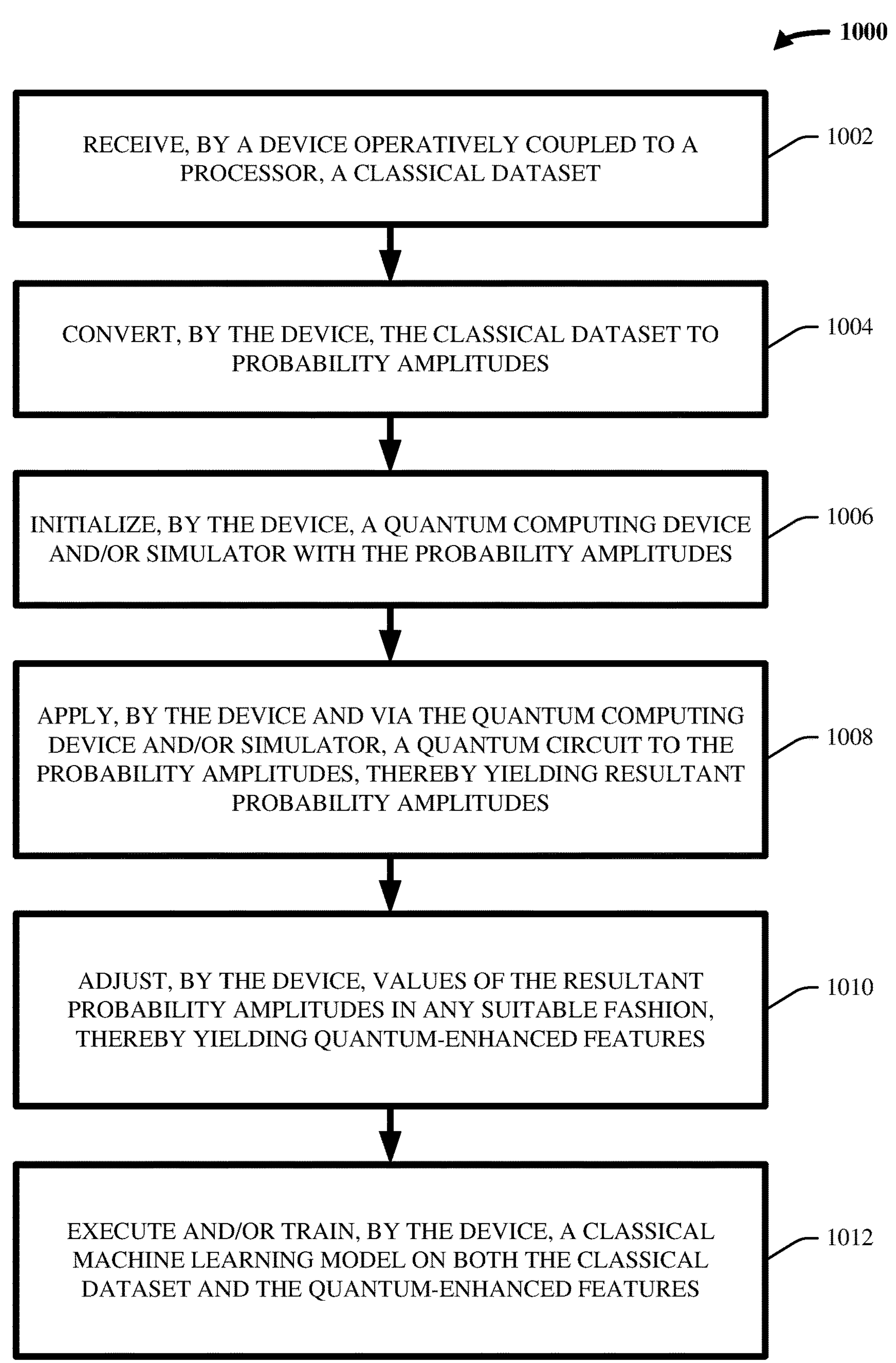
FIG. 10 illustrates a flow diagram of an example, non-limiting computer-implemented method that facilitates quantum-enhanced features for classical machine learning in accordance with one or more embodiments described herein.

FIG. 10 illustrates a flow diagram of an example, non-limiting computer-implemented method 1000 that can facilitate quantum-enhanced features for classical machine learning in accordance with one or more embodiments described herein. In some cases, the computer-implemented method 1000 can be implemented by the quantum-enhanced feature system 102.

In various embodiments, act 1002 can include receiving, by a device (e.g., 112) operatively coupled to a processor, a classical dataset (e.g., 104).

In various aspects, act 1004 can include converting, by the device (e.g., 114), the classical dataset to probability amplitudes (e.g., 202).

In various instances, act 1006 can include initializing, by the device (e.g., 116), a quantum computing device and/or simulator (e.g., 122) with the probability amplitudes.

In various cases, act 1008 can include applying, by the device (e.g., 116) and via the quantum computing device and/or simulator, a quantum circuit (e.g., 402) to the probability amplitudes, thereby yielding resultant probability amplitudes (e.g., 404).

In various aspects, act 1010 can include adjusting, by the device (e.g., 118), values of the resultant probability amplitudes in any suitable fashion, thereby yielding quantum-enhanced features (e.g., 702). As mentioned above, it can sometimes be the case that no adjustment to the resultant probability amplitudes is made, in which case the quantum-enhanced features would be equal to the resultant probability amplitudes.

In various instances, act 1012 can include executing, by the device (e.g., 120), a classical machine learning model (e.g., 106) on both the classical dataset and the quantum-enhanced features.

Figure 11:
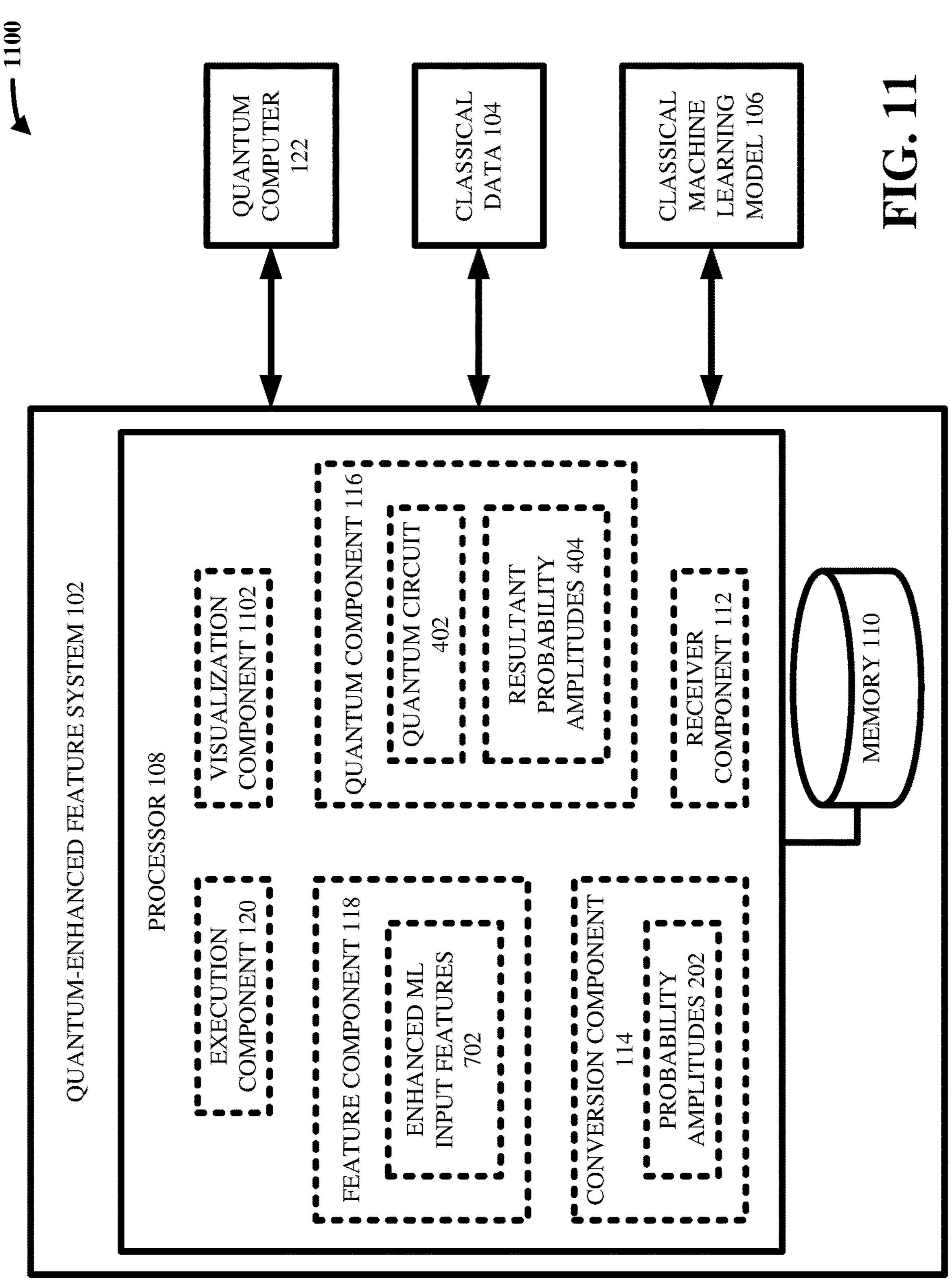
FIG. 11 illustrates a block diagram of an example, non-limiting system including a visualization component that facilitates quantum-enhanced features for classical machine learning in accordance with one or more embodiments described herein.

FIG. 11 illustrates a block diagram of an example, non-limiting system 1100 including a visualization component that can facilitate quantum-enhanced features for classical machine learning in accordance with one or more embodiments described herein. As shown, the system 1100 can, in some cases, comprise the same components as the system 700, and can further comprise a visualization component 1102.

In various aspects, the visualization component 1102 can electronically render, display, graph, and/or plot the enhanced ML input features 702. For instance, in various cases, the visualization component 1102 can be electronically integrated (e.g., via any suitable wired and/or wireless electronic connection) with a computer monitor/screen (not shown). In such cases, the visualization component 1102 can electronically display graphs/plots of the enhanced ML input features 702 on the computer monitor/screen. In some cases, the visualization component 1102 can electronically display graphs/plots of the classical data 104 on the computer monitor/screen as well, so that the classical data 104 can be visually compared with the enhanced ML input features 702. Those having ordinary skill in the art will appreciate that any suitable graphs and/or plots can be implemented by the visualization component 1102 (e.g., histograms, bar graphs, Bloch spheres, 2D and/or 3D plots).

Figure 12:
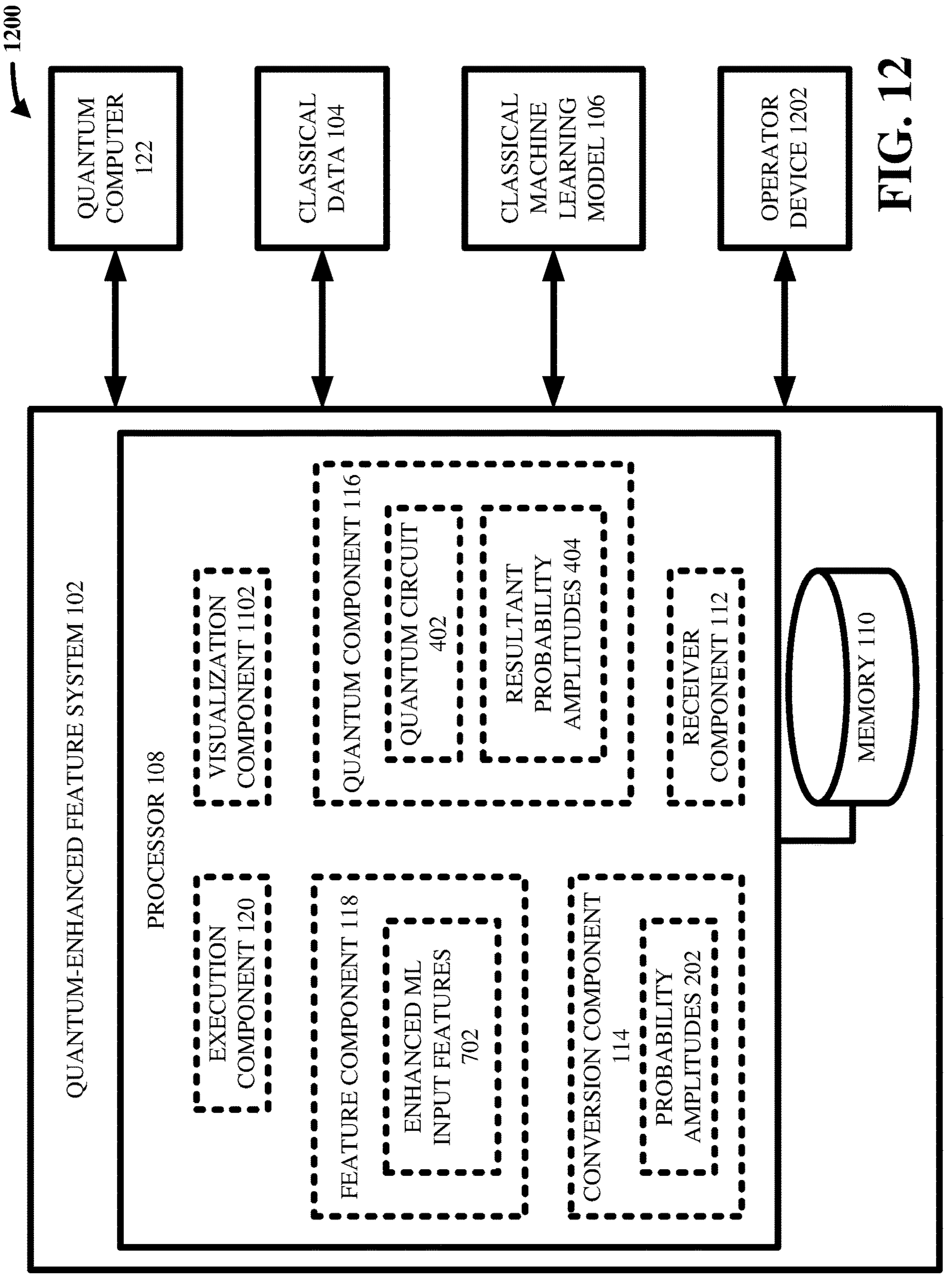
FIG. 12 illustrates a block diagram of an example, non-limiting system including an operator device that facilitates quantum-enhanced features for classical machine learning in accordance with one or more embodiments described herein.

FIG. 12 illustrates a block diagram of an example, non-limiting system 1200 including an operator device that can facilitate quantum-enhanced features for classical machine learning in accordance with one or more embodiments described herein. As shown, the system 1200 can, in some cases, comprise the same components as the system 1100, and can further comprise an operator device 1202.

In various aspects, the quantum-enhanced feature system 102 can be electronically integrated, via any suitable wired and/or wireless electronic connection, with the operator device 1202. In various instances, the operator device 1202 can be associated with an entity (e.g., a client) that desires to utilize the functionality offered by the quantum-enhanced feature system 102. For instance, such entity can own and/or maintain the classical data 104, and such entity can desire to have the classical data 104 quantum-enriched. In such case, the operator device 1202 can provide the classical data 104 to the quantum-enhanced feature system 102 (e.g., can electronically transmit a copy of the classical data 104 to the receiver component 112). In various aspects, the operator device 1202 can further identify the quantum circuit 402. In other words, the entity associated with the operator device 1202 can desire to have the classical data 104 transformed and/or enhanced by a particular quantum circuit, and the operator device 1202 can electronically transmit to the receiver component 112 an identifier of that particular quantum circuit. Accordingly, after the conversion component 114 converts the classical data 104 into the probability amplitudes 202, and after the quantum component 116 initializes the quantum computer 122 with the probability amplitudes 202, the quantum component 116 can execute on the quantum computer 122 the quantum circuit indicated by the operator device 1202. In some instances, the quantum component 116 can provide a list of available quantum circuits (not shown) to the operator device 1202, and the operator device 1202 can select from such list the quantum circuit that the entity associated with the operator device 1202 desires to be executed. In various instances, once the enhanced ML input features 702 are generated, the execution component 120 can electronically transmit the enhanced ML input features 702 (and/or any graphs/plots generated by the visualization component 1102) to the operator device 1202.

FIGS. 13-14 illustrate flow diagrams of example, non-limiting computer-implemented methods 1300 and 1400 that can facilitate quantum-enhanced features for classical machine learning in accordance with one or more embodiments described herein.

First consider the computer-implemented method 1300. In various embodiments, act 1302 can include accessing, by a device (e.g., 112) operatively coupled to a processor, a classical dataset (e.g., 104).

In various aspects, act 1304 can include generating, by the device (e.g., 118), one or more machine learning input features (e.g., 702) based on a quantum transformation (e.g., collectively involving 202, 402, and/or 404) of the classical dataset.

In various instances, act 1306 can include executing, by the device (e.g., 120), a classical machine learning model (e.g., 106) on the one or more machine learning input features.

Although not explicitly shown in FIG. 13, the computer-implemented method 1300 can further comprise: converting, by the device (e.g., 114), the classical dataset into a set of quantum probability amplitudes (e.g., 202); and executing, by the device (e.g., 116), a quantum circuit (e.g., 402) on the set of quantum probability amplitudes, thereby yielding the quantum transformation of the classical dataset.

Although not explicitly shown in FIG. 13, the computer-implemented method 1300 can further comprise: visually rendering, by the device (e.g., 1102), both the classical dataset and the one or more machine learning input features.

Now, consider the computer-implemented method 1400. In various embodiments, act 1402 can include receiving, by a device (e.g., 112) operatively coupled to a processor, a classical timeseries dataset (e.g., 104) from an operator device (e.g., 1202).

In various aspects, act 1404 can include generating, by the device (e.g., 118), one or more quantum-enhanced machine learning input features (e.g., 702) based on a quantum transformation (e.g., collectively involving 202, 402, and/or 404) of the classical timeseries dataset.

In various instances, act 1406 can include transmitting, by the device (e.g., 120), to the operator device the one or more quantum-enhanced machine learning input features.

Although not explicitly shown in FIG. 14, the computer-implemented method 1400 can further comprise: generating, by the device (e.g., 114), quantum probability amplitudes (e.g., 202) based on the classical timeseries dataset; and executing, by the device (e.g., 116), on the quantum probability amplitudes a quantum algorithm (e.g., 402) selected by the operator device, thereby yielding the quantum transformation of the classical timeseries dataset.

Although not explicitly shown in FIG. 14, the computer-implemented method 1400 can further comprise: graphing, by the device (e.g., 1102), the classical timeseries dataset or the one or more quantum-enhanced machine learning input features.

Various embodiments of the invention can enhance, enrich, and/or otherwise augment classical datasets by leveraging quantum computing. Specifically, various embodiments of the invention can be considered as a computerized tool that can receive as input a classical dataset, that can convert the classical dataset into quantum probability amplitudes (e.g., thereby importing the classical dataset into a quantum Hilbert space), that can initialize a quantum computer with the quantum probability amplitudes, and that can execute a quantum circuit on the quantum computer (e.g., thereby transforming the classical dataset in the quantum Hilbert space). In various instances, the resulting quantum probability amplitudes can be used to generate enhanced ML input features. Indeed, in various cases, the resulting quantum probability amplitudes can be themselves considered as the enhanced ML input features. As explained herein, the enhanced ML input features can exhibit more nuanced data patterns, trends, and/or distributions that were previously hidden within the classical dataset. Accordingly, the enhanced ML input features can be fed as input to a classical ML model, which can improve the performance (e.g., accuracy) of the classical ML model.

In various aspects, such a computerized tool can be implemented to enhance any suitable type of classical data (e.g., timeseries data, non-timeseries data, financial data, geospatial data, image data, audio data, video data, pressure data, voltage/current data, sales data, resource data). For example, in some cases, such a computerized tool can be implemented in the field of supply chain analysis (e.g., the computerized tool can enhance a timeseries that indicates resource consumption over time, and such enhanced data can be fed to a classical ML model to more accurately forecast future resource consumption). As another example, in some cases, such a computerized tool can be implemented in the field of market science (e.g., the computerized tool can enhance a timeseries that indicates number of visitors to an online website over time, and such enhanced data can be fed to a classical ML model to more accurately forecast future numbers of online visitors). In various instances, any other suitable type of classical data can be enhanced by various embodiments of the invention.

Although various examples described herein discuss enhancing classical data by applying the Quantum Fourier Transform to such classical data, this is a non-limiting example. In various cases, those having ordinary skill in the art will appreciate that any suitable quantum circuit and/or quantum algorithm can be used to enhance and/or enrich classical data.

Figure 15:
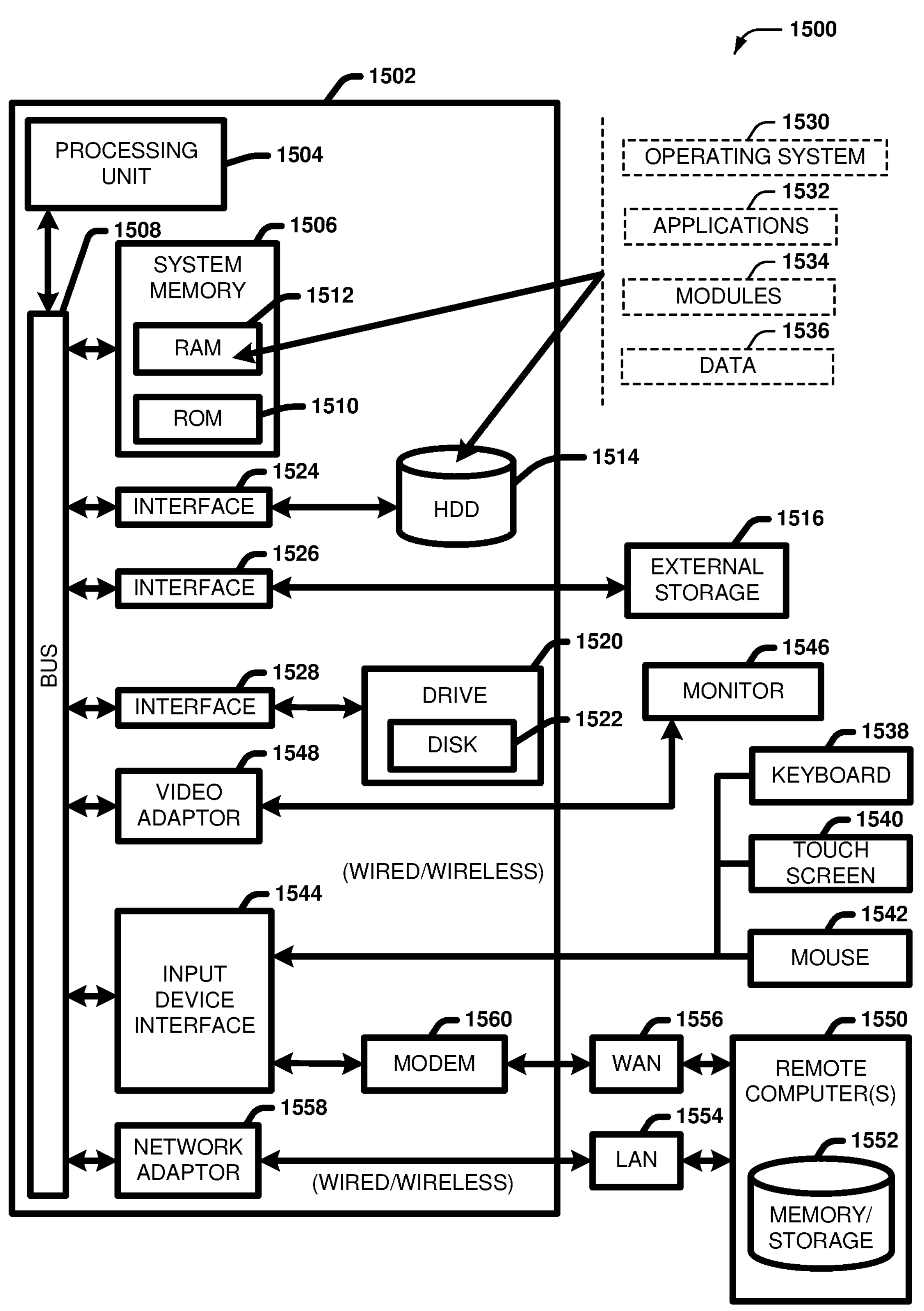
FIG. 15 illustrates a block diagram of an example, non-limiting operating environment in which one or more embodiments described herein can be facilitated.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and a drive 1520, e.g., such as a solid state drive, an optical disk drive, which can read or write from a disk 1522, such as a CD-ROM disc, a DVD, a BD, etc. Alternatively, where a solid state drive is involved, disk 1522 would not be included, unless separate. While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and drive 1520 can be connected to the system bus 1508 by an HDD interface 1524, an external storage interface 1526 and a drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enable with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above, such as but not limited to a network virtual machine providing one or more aspects of storage or processing of information. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Referring now to FIG. 16, illustrative cloud computing environment 1600 is depicted. As shown, cloud computing environment 1600 includes one or more cloud computing nodes 1602 with which local computing devices used by cloud consumers, such as, for example, personal digital assistant (PDA) or cellular telephone 1604, desktop computer 1606, laptop computer 1608, and/or automobile computer system 1610 may communicate. Nodes 1602 may communicate with one another. They may be grouped (not shown) physically or virtually, in one or more networks, such as Private, Community, Public, or Hybrid clouds as described hereinabove, or a combination thereof. This allows cloud computing environment 1600 to offer infrastructure, platforms and/or software as services for which a cloud consumer does not need to maintain resources on a local computing device. It is understood that the types of computing devices 1604-1610 shown in FIG. 16 are intended to be illustrative only and that computing nodes 1602 and cloud computing environment 1600 can communicate with any type of computerized device over any type of network and/or network addressable connection (e.g., using a web browser).

Figure 17:
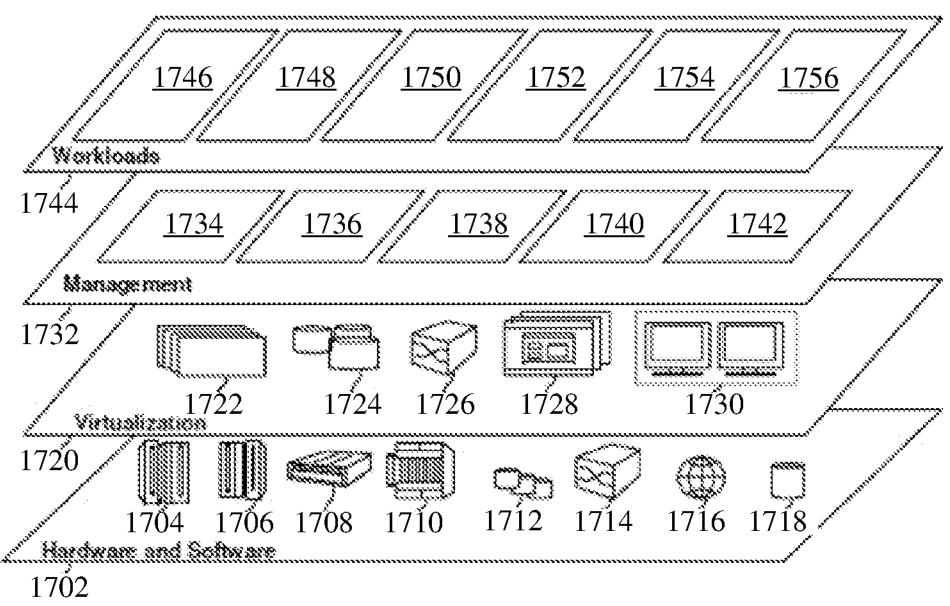
FIG. 17 illustrates example, non-limiting abstraction model layers in accordance with one or more embodiments described herein.

Referring now to FIG. 17, a set of functional abstraction layers provided by cloud computing environment 1600 (FIG. 16) is shown. Repetitive description of like elements employed in other embodiments described herein is omitted for sake of brevity. It should be understood in advance that the components, layers, and functions shown in FIG. 17 are intended to be illustrative only and embodiments of the invention are not limited thereto. As depicted, the following layers and corresponding functions are provided.

Hardware and software layer 1702 includes hardware and software components. Examples of hardware components include: mainframes 1704; RISC (Reduced Instruction Set Computer) architecture based servers 1706; servers 1708; blade servers 1710; storage devices 1712; and networks and networking components 1714. In some embodiments, software components include network application server software 1716 and database software 1718.

Virtualization layer 1720 provides an abstraction layer from which the following examples of virtual entities may be provided: virtual servers 1722; virtual storage 1724; virtual networks 1726, including virtual private networks; virtual applications and operating systems 1728; and virtual clients 1730.

In one example, management layer 1732 may provide the functions described below. Resource provisioning 1734 provides dynamic procurement of computing resources and other resources that are utilized to perform tasks within the cloud computing environment. Metering and Pricing 1736 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1738 provides access to the cloud computing environment for consumers and system administrators. Service level management 1740 provides cloud computing resource allocation and management such that required service levels are met. Service Level Agreement (SLA) planning and fulfillment 1742 provide pre-arrangement for, and procurement of, cloud computing resources for which a future requirement is anticipated in accordance with an SLA.

Workloads layer 1744 provides examples of functionality for which the cloud computing environment may be utilized. Examples of workloads and functions which may be provided from this layer include: mapping and navigation 1746; software development and lifecycle management 1748; virtual classroom education delivery 1750; data analytics processing 1752; transaction processing 1754; and differentially private federated learning processing 1756. Various embodiments of the present invention can utilize the cloud computing environment described with reference to FIGS. 16 and 17 to execute one or more differentially private federated learning process in accordance with various embodiments described herein.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like.

The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a processor that executes computer-executable components stored in a computer-readable memory, the computer-executable components comprising:

a receiver component that accesses a classical dataset;

a conversion component that:

normalizes the classical dataset to generate a normalized vector; and encodes the normalized vector into an N-element quantum state vector of quantum probability amplitudes using amplitude embedding, wherein the N-element quantum state vector is implemented using $\log_2(N)$ qubits;

a quantum component that:

initializes a quantum computing device with the quantum probability amplitudes via an initialization circuit; and executes, on the quantum computing device, a quantum circuit comprising a Quantum Fourier Transform to transform the quantum state vector into a resultant quantum state vector;

a feature component that:

extracts resultant probability amplitudes from the resultant quantum state vector; and generates one or more machine learning input features from the resultant probability amplitudes; and an execution component that integrates the machine learning input features into a classical machine learning model to produce a predictive output.

2. The system of claim 1, wherein the computer-executable components further comprise:

an execution component that executes a classical machine learning model on the one or more machine learning input features, the model being retrained or fine-tuned using the features derived from the transformed quantum state to enhance prediction accuracy.

3. The system of claim 1, wherein the Quantum Fourier Transform is implemented as a sequence of quantum gate operations comprising a plurality of Hadamard gates and controlled phase rotation gates applied across the $\log_2(N)$ qubits of the quantum state vector.

4. The system of claim 1, wherein the computer-executable components further comprise:

a visualization component that visually renders both the classical dataset and the one or more machine learning input features, highlighting structural differences or non-classical relationships revealed by the quantum transformation.

5. The system of claim 1, wherein the one or more quantum-enhanced machine learning input features are fed as input to a classical machine learning model, thereby facilitating improved model convergence and reducing overfitting by incorporating frequency-domain or correlation-based features revealed through the quantum transformation.

6. A computer-implemented method, comprising:

accessing, by a device operatively coupled to a processor, a classical dataset;

normalizing, by the device, the classical dataset to generate a normalized vector;

encoding, by the device, the normalized vector into an N-element quantum state vector of quantum probability amplitudes using amplitude embedding, wherein the N-element quantum state vector is implemented using $\log_2(N)$ qubits;

initializing, by the device, a quantum computing device with the quantum probability amplitudes via an initialization circuit;

executing, by the device, a quantum circuit comprising a Quantum Fourier Transform on the quantum computing device to obtain a resultant quantum state vector;

extracting, by the device, resultant probability amplitudes from the resultant quantum state vector;

generating, by the device, one or more machine learning input features from the resultant probability amplitudes; and integrating the input features into a classical machine learning model to produce a prediction output.

7. The computer-implemented method of claim 6, further comprising:

executing, by the device, a classical machine learning model on the one or more machine learning input features using the quantum-derived features, wherein the model is retrained or fine-tuned based on quantum-revealed structures to improve predictive generalization.

8. The computer-implemented method of claim 6, wherein the Quantum Fourier Transform is implemented as a sequence of quantum gate operations comprising a plurality of Hadamard gates and controlled phase rotation gates applied across the $\log_2(N)$ qubits of the quantum state vector.

9. The computer-implemented method of claim 6, further comprising:

visually rendering, by the device, both the classical dataset and the one or more machine learning input features derived from the quantum transformation to illustrate enhanced feature separability or pattern discovery.

10. The computer-implemented method of claim 6, wherein the one or more quantum-enhanced machine learning input features are fed as input to a classical machine learning model, thereby enabling the model to detect hidden structures or periodic patterns in the data that are not represented in the original classical feature space.

11. A computer program product for facilitating quantum-enhanced features for classical machine learning, the computer program product comprising a computer-readable memory having program instructions embodied therewith, the program instructions executable by a processor to cause the processor to:

access, by the processor, a classical dataset;

normalize, by the processor, the classical dataset to generate a normalized vector;

encode, by the processor, the normalized vector into an N-element quantum state vector of quantum probability amplitudes using amplitude embedding, wherein the N-element quantum state vector is implemented using $\log_2(N)$ qubits;

initialize, by the processor, a quantum computing device with the quantum probability amplitudes via an initialization circuit;

execute, by the processor, a quantum circuit comprising a Quantum Fourier Transform on the quantum computing device to obtain a resultant quantum state vector;

extract, by the processor, resultant probability amplitudes from the resultant quantum state vector;

generate, by the processor, machine learning input features from the resultant probability amplitudes; and integrate, by the processor, the input features into a classical machine learning model to produce a predictive output.

12. The computer program product of claim 11, wherein the program instructions are further executable to cause the processor to:

retrain or adapt, by the processor, a classical machine learning model using the quantum-derived input features to improve generalization and model robustness.

13. The computer program product of claim 11, wherein the Quantum Fourier Transform is implemented as a sequence of quantum gate operations comprising a plurality of Hadamard gates and controlled phase rotation gates applied across the $\log_2(N)$ qubits of the quantum state vector.

14. The computer program product of claim 11, wherein the program instructions are further executable to cause the processor to:

render, by the processor, visualizations of both the classical and quantum-derived feature representations, highlighting quantum-revealed distinctions for interpretability.

15. The computer program product of claim 11, wherein the one or more quantum-enhanced machine learning input features are fed as input to a classical machine learning model, thereby enhancing classification boundaries or prediction precision due to enriched feature representations derived from the quantum-transformed data.

16. A system, comprising:

a processor that executes computer-executable components stored in a computer-readable memory, the computer-executable components comprising:

a receiver component that receives a classical timeseries dataset from an operator device;

a conversion component that:

normalizes the classical timeseries dataset to generate a normalized vector; and encodes the normalized vector into an N-element quantum state vector of quantum probability amplitudes using amplitude embedding, wherein the N-element quantum state vector is implemented using $\log_2(N)$ qubits;

a quantum component that:

initializes a quantum computing device with the quantum probability amplitudes via an initialization circuit; and executes, on the quantum computing device, a quantum algorithm comprising a Quantum Fourier Transform to transform the quantum state vector into a resultant quantum state vector;

a feature component that:

extracts resultant probability amplitudes from the resultant quantum state vector; and generates quantum-enhanced machine learning input features from the resultant probability amplitudes; and an execution component that integrates the quantum-enhanced machine learning input features into a classical machine learning model to produce a predictive output.

17. The system of claim 16, wherein the computer-executable components further comprise:

an execution component that transmits the quantum-enhanced input features to the operator device or integrates them into a retrained classical model configured to detect or predict temporal phenomena.

18. The system of claim 16, wherein the Quantum Fourier Transform is implemented as a sequence of quantum gate operations comprising a plurality of Hadamard gates and controlled phase rotation gates applied across the $\log_2(N)$ qubits of the quantum state vector.

19. The system of claim 16, wherein the computer-executable components further comprise:

a visualization component that graphs the classical timeseries dataset alongside the quantum-enhanced features, showing distinctions in temporal structure revealed by the transformation.

20. The system of claim 16, wherein the one or more quantum-enhanced machine learning input features are fed as input to a classical machine learning model, thereby enabling more accurate forecasting of temporal events by leveraging latent cyclic or frequency-domain trends extracted via the quantum algorithm.

21. A computer-implemented method, comprising:

receiving, by a device operatively coupled to a processor, a classical timeseries dataset from an operator device;

normalizing, by the device, the classical timeseries dataset to generate a normalized vector; and encoding, by the device, the normalized vector into an N-element quantum state vector of quantum probability amplitudes using amplitude embedding, wherein the N-element quantum state vector is implemented using $\log_2(N)$ qubits;

initializing, by the device, a quantum computing device with the quantum probability amplitudes via an initialization circuit; and executing, by the device, a quantum algorithm comprising a Quantum Fourier Transform on the quantum computing device to obtain a resultant quantum state vector;

extracting, by the device, resultant probability amplitudes from the resultant quantum state vector; and generating, by the device, quantum-enhanced machine learning input features from the resultant probability amplitudes; and integrating, by the device, the features into a classical model to produce a predictive output.

22. The computer-implemented method of claim 21, further comprising:

transmitting, by the device, the quantum-enhanced features to the operator device or updating the classical model to reflect time-dependent correlations learned from the quantum transformation.

23. The computer-implemented method of claim 21, wherein the Quantum Fourier Transform is implemented as a sequence of quantum gate operations comprising a plurality of Hadamard gates and controlled phase rotation gates applied across the $\log_2(N)$ qubits of the quantum state vector.

24. The computer-implemented method of claim 21, further comprising:

graphing, by the device, the original timeseries data and the quantum-derived features to compare pattern representations and validate improved model inputs.

25. The computer-implemented method of claim 21, wherein the one or more quantum-enhanced machine learning input features are fed as input to a classical machine learning model, thereby allowing the model to generalize more effectively across time-dependent datasets by incorporating quantum-revealed temporal dependencies.

* * * * *